United States Patent
Tanaka et al.

(10) Patent No.: US 9,207,432 B2
(45) Date of Patent: Dec. 8, 2015

(54) IMAGING LENS AND IMAGING DEVICE PROVIDED WITH THE SAME

(71) Applicant: FUJIFILM Corporation, Tokyo (JP)

(72) Inventors: Takuya Tanaka, Saitama-ken (JP); Tatsuro Iwasaki, Saitama-ken (JP); Michio Cho, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/490,040

(22) Filed: Sep. 18, 2014

(65) Prior Publication Data
US 2015/0085385 A1 Mar. 26, 2015

(30) Foreign Application Priority Data
Sep. 20, 2013 (JP) .................. 2013-195412

(51) Int. Cl.
*G02B 9/60* (2006.01)
*G02B 13/18* (2006.01)
*G02B 13/00* (2006.01)

(52) U.S. Cl.
CPC .............. *G02B 13/0045* (2013.01); *G02B 9/60* (2013.01)

(58) Field of Classification Search
CPC .............................. G02B 9/60; G02B 13/0045
USPC .................................................. 359/714, 764
See application file for complete search history.

(56) References Cited

U.S. PATENT DOCUMENTS

| 8,743,479 B2 | 6/2014 | Tsai et al. |
| 2013/0033765 A1 | 2/2013 | Tsai et al. |
| 2014/0340568 A1* | 11/2014 | Sano ................ G02B 13/0045 348/360 |

FOREIGN PATENT DOCUMENTS

CN 202631836 12/2012

* cited by examiner

*Primary Examiner* — William Choi
(74) *Attorney, Agent, or Firm* — Young & Thompson

(57) ABSTRACT

An imaging lens substantially consists of five lenses consisting of, in order from the object side: a first lens having a positive refractive power and having a meniscus shape with a convex surface toward the object side; a second lens having a biconcave shape; a third lens having a positive refractive power and having a meniscus shape with a convex surface toward the image side; a fourth lens having a meniscus shape with a convex surface toward the image side; and a fifth lens having a negative refractive power and having a concave surface toward the object side.

20 Claims, 14 Drawing Sheets

IMAGING LENS AND IMAGING DEVICE PROVIDED WITH THE SAME

CROSS-REFERENCE TO RELATED APPLICATIONS

The present application claims priority under 35 U.S.C. §119 to Japanese Patent Application No. 2013-195412, filed on Sep. 20, 2013. The above application is hereby expressly incorporated by reference, in its entirety, into the present application.

BACKGROUND OF THE INVENTION

1. Field of the Invention

The present invention relates to a fixed-focus imaging lens that forms an optical image of a subject on an image sensor, such as a CCD (Charge Coupled Device) or CMOS (Complementary Metal Oxide Semiconductor), and an imaging device that is provided with the imaging lens and performs imaging, such as an imaging device incorporated in a digital still camera, a mobile phone with camera, a PDA (Personal Digital Assistance), a smartphone, a tablet-type terminal, a portable video game player, etc.

2. Description of the Related Art

Along with the spread of personal computers in ordinary homes, etc., digital still cameras that are capable of inputting image information, such as photographed landscapes and portraits, to a personal computer are also rapidly spreading. Further, more and more mobile phones, smartphones and tablet-type terminals are equipped with a camera module for inputting images. The above-mentioned devices capable of imaging use an image sensor, such as a CCD or CMOS. In recent years, such image sensors are becoming more compact, and there are also demands for compact imaging devices and compact imaging lenses to be incorporated in the imaging devices. At the same time, pixel density of such image sensors is also becoming higher, and imaging lenses with higher resolution and higher performance are demanded. For example, performance that can accommodate a high pixel density of 5 megapixel or more, or more preferably 8 megapixel or more is demanded.

In order to meet the above-described demands, an imaging lens formed by a relatively large number of lenses, namely, having a five-lens configuration may be provided. For example, each of United States Patent Application Publication No. 20130033765 and Chinese Utility Model Patent No. 202631836 (hereinafter, Patent Documents 1 and 2, respectively) proposes an imaging lens with a five-lens configuration including, in order from the object side, a first lens having a positive refractive power, a second lens having a negative refractive power, a third lens having a positive refractive power, a fourth lens, and a fifth lens having a negative refractive power.

SUMMARY OF THE INVENTION

On the other hand, for an imaging lens for use, in particular, with devices that are becoming thinner and thinner, such as PDAs, smartphones and tablet-type terminals, it is desired to accomplish an imaging lens with a large image size that is sufficient for accommodating a large-size image sensor that meets the demand for higher resolution, while achieving reduction of the entire length of the lens. If the imaging lens disclosed in each of Patent Documents 1 and 2 is applied to an image size that meets the demand for higher resolution, the entire length of the lens becomes excessively long, and reduction of the entire length of the lens relative to the image size is desired.

In view of the above-described circumstances, the present invention is directed to providing an imaging lens having an image size that can accommodate the demand for higher resolution and capable of achieving high imaging performance throughout from the central angle of view to the peripheral angle of view while achieving reduction of the entire length of the lens, and an imaging device provided with the imaging lens and capable of capturing high-resolution images.

An aspect of the imaging lens of the invention is an imaging lens substantially consisting of five lenses consisting of, in order from an object side: a first lens having a positive refractive power and having a meniscus shape with a convex surface toward the object side; a second lens having a biconcave shape; a third lens having a positive refractive power and having a meniscus shape with a convex surface toward the image side; a fourth lens having a meniscus shape with a convex surface toward the image side; and a fifth lens having a negative refractive power and having a concave surface toward the object side.

According to the imaging lens of the invention, which has the five lens configuration as a whole, the configuration of each of the lens elements, the first to the fifth lenses, is optimized, thereby accomplishing a lens system having high resolution performance while achieving reduction of the entire length of the lens.

It should be noted that, with respect to the imaging lens of the invention, the expression "substantially consisting of five lenses" means that the imaging lens of the invention may include, in addition to the five lenses: lenses substantially without any power; optical elements other than lenses, such as a stop and a cover glass; mechanical components, such as a lens flange, a lens barrel, an image sensor, and a camera shake correcting mechanism; etc. It should be noted that the sign (positive or negative) with respect to the surface shape or the refractive power of any lens having an aspheric surface of the above-described lenses is about the paraxial region.

When the imaging lens of the invention further employs and satisfies the following preferred features, even higher optical performance can be achieved.

In the imaging lens of the invention, it is preferred that the fifth lens have a biconcave shape.

In the imaging lens of the invention, it is preferred that the fifth lens have an image-side surface having at least one inflection point.

In the imaging lens of the invention, it is preferred that the fourth lens has a positive refractive power.

It is preferred that the imaging lens of the invention satisfy any of the conditional expressions (1) to (6) below:

$$0.8 < f/f1 < 3 \tag{1},$$

$$1 < f/f1 < 2.5 \tag{1-1},$$

$$0.5 < f \tan \omega / L5r < 20 \tag{2},$$

$$0.7 < f \tan \omega / L5r < 10 \tag{2-1},$$

$$1 < f \tan \omega / L5r < 5 \tag{2-2},$$

$$-10 < f/f345 < 0 \tag{3},$$

$$-5 < f/f345 < -0.1 \tag{3-1},$$

$$-1 < f/f345 < -0.15 \tag{3-2},$$

$$0 < (L3f - L3r)/(L3f + L3r) < 1.2 \qquad (4),$$

$$0 < (L3f - L3r)/(L3f + L3r) < 1.1 \qquad (4\text{-}1),$$

$$0.05 < (L3f - L3r)/(L3f + L3r) < 1 \qquad (4\text{-}2),$$

$$1 < TTL/H < 1.55 \qquad (5),$$

$$1.2 < TTL/H < 1.5 \qquad (5\text{-}1),$$

$$1.3 < TTL/H < 1.45 \qquad (5\text{-}2), \text{ and}$$

$$0.2 < f/f34 < 1.1 \qquad (6),$$

where f is a focal length of the entire system, f1 is a focal length of the first lens, ω is a half angle of view, L5r is a paraxial radius of curvature of the image-side surface of the fifth lens, f345 is a combined focal length of the third to the fifth lenses, L3f is a paraxial radius of curvature of the object-side surface of the third lens, L3r is a paraxial radius of curvature of the image-side surface of third lens, TTL is a distance from the object-side surface of the first lens to the image plane, where the back focus portion of the distance is an equivalent air distance, H is a maximum image height, and f34 is a combined focal length of the third lens and the fourth lens. In preferred aspects of the invention, any one or any combination of the conditional expressions (1) to (6) may be satisfied.

The imaging device according to the invention comprises the imaging lens of the invention.

According to the imaging lens of the invention, which has the five lens configuration as a whole, the configuration of each lens element, in particular, the shape of each of the first to the fifth lenses is optimized, thereby accomplishing a lens system having an image size that can accommodate the demand for higher resolution and having high imaging performance throughout from the central angle of view to the peripheral angle of view, while achieving reduction of the entire length of the lens.

Further, the imaging device of the invention outputs an imaging signal according to an optical image formed by the imaging lens with high imaging performance of the invention, and therefore can capture high-resolution images.

DESCRIPTION OF THE PREFERRED EMBODIMENTS

Hereinafter, embodiments of the present invention will be described in detail with reference to the drawings.

Figure 1:
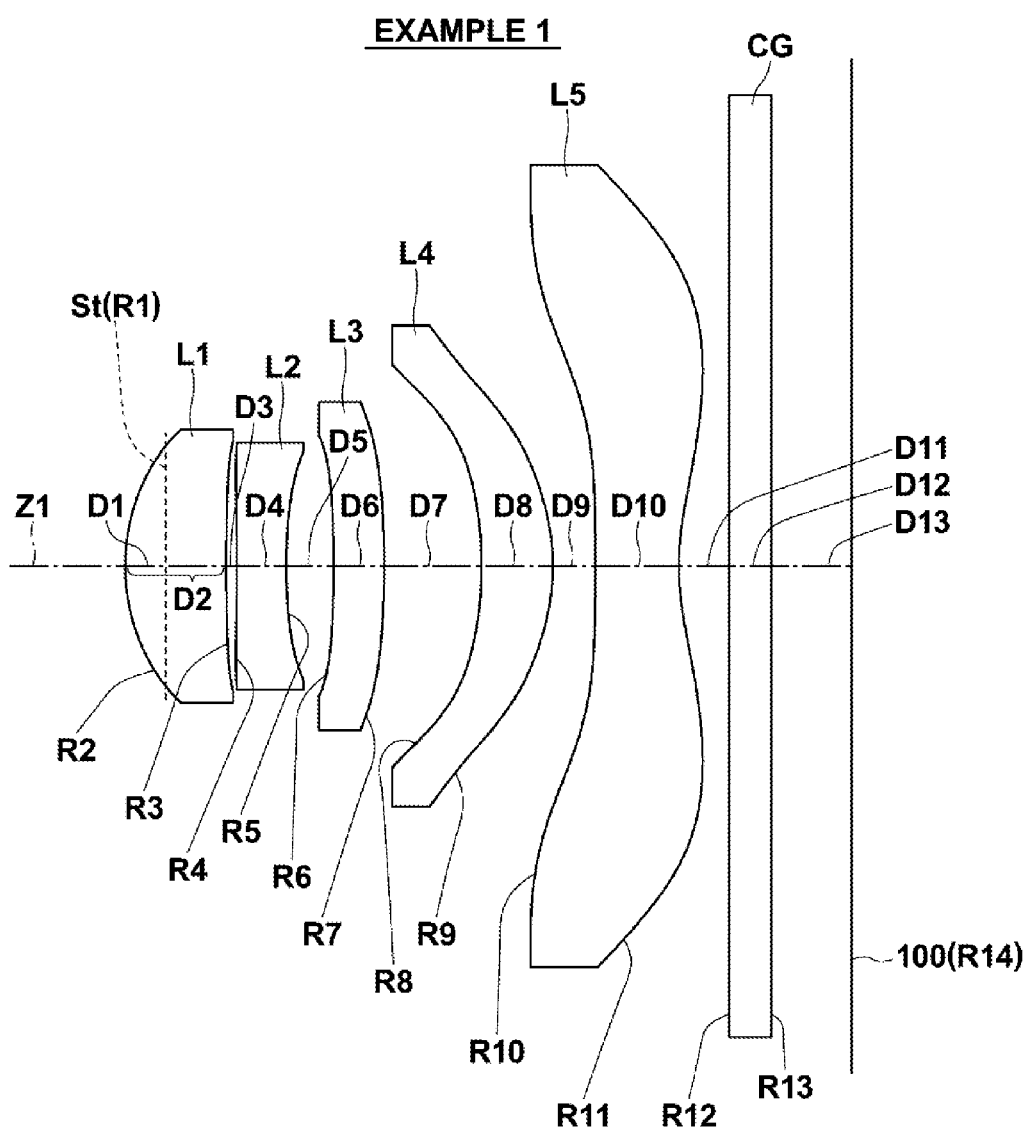
FIG. 1 is a lens sectional view illustrating a first configuration example of an imaging lens according to one embodiment of the invention and corresponding to Example 1.
Figure 7:
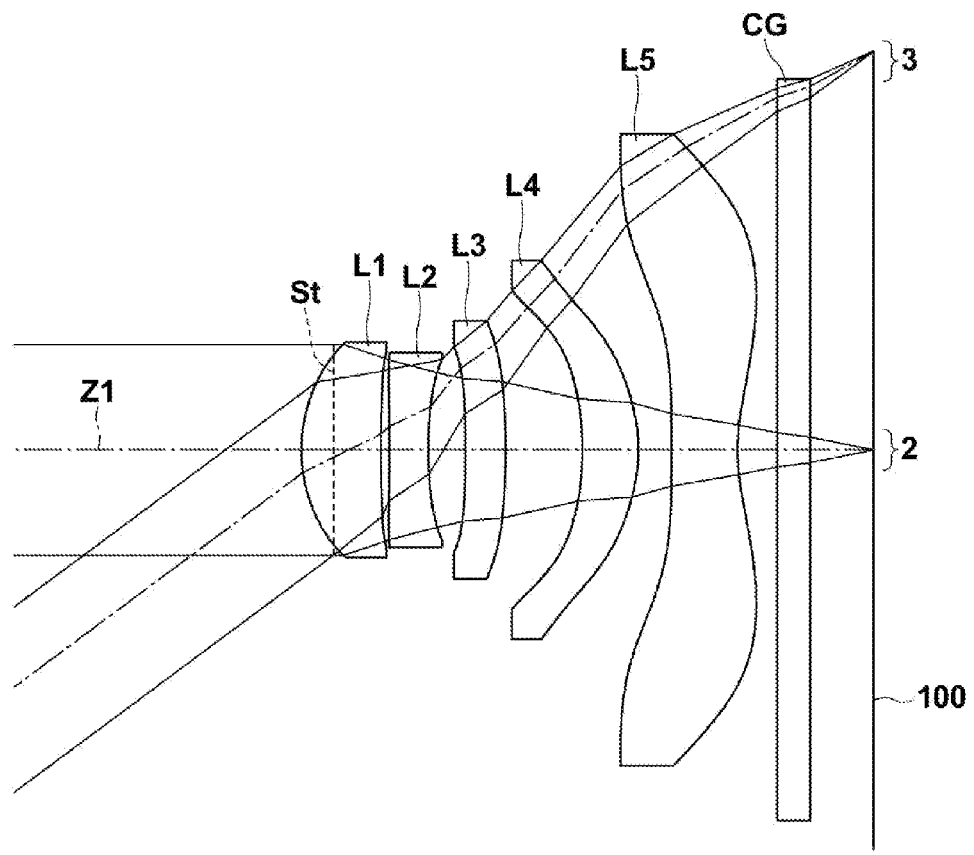
FIG. 7 is a lens sectional view illustrating optical paths through the imaging lens shown in FIG. 1.

FIG. 1 shows a first configuration example of an imaging lens according to a first embodiment of the invention. This configuration example corresponds to a lens configuration of a first numerical example (shown in Tables 1 and 2), which will be described later. Similarly, FIGS. 2 to 6 show cross-sectional configurations of second to sixth configuration examples corresponding to imaging lenses L according to second to sixth embodiments, which will be described later. The second to sixth configuration examples correspond to lens configurations of second to sixth numerical examples (shown in Tables 3 to 12), which will be described later. In FIGS. 1 to 6, each symbol "Ri" denotes a radius of curvature of the i-th surface, where the most object-side surface of the lens elements is the first surface and the surface number is sequentially increased toward the image side (the formed image side), and each symbol "Di" denotes a surface distance between the i-th surface and the i+1-th surface along the optical axis Z1. It should be noted that these configuration examples have the same basic configuration. Therefore the following description is made based on the configuration example of the imaging lens L shown in FIG. 1, and the configuration examples shown in FIGS. 2 to 6 are described as necessary. FIG. 7 is a lens sectional view showing optical paths through the imaging lens L shown in FIG. 1. FIG. 7 shows optical paths of an axial bundle of rays 2 and a bundle of rays 3 at the maximum angle of view from an object point at infinity.

The imaging lens L according to each embodiment of the invention is preferably usable with various imaging devices using an image sensor, such as a CCD or CMOS, in particular, relatively small portable terminal devices, such as digital still cameras, mobile phones with camera, smartphones, tablet-type terminals and PDAs. The imaging lens L includes, in order from the object side along the optical axis Z1, a first lens L1, a second lens L2, a third lens L3, a fourth lens L4, and a fifth lens L5.

Figure 14:
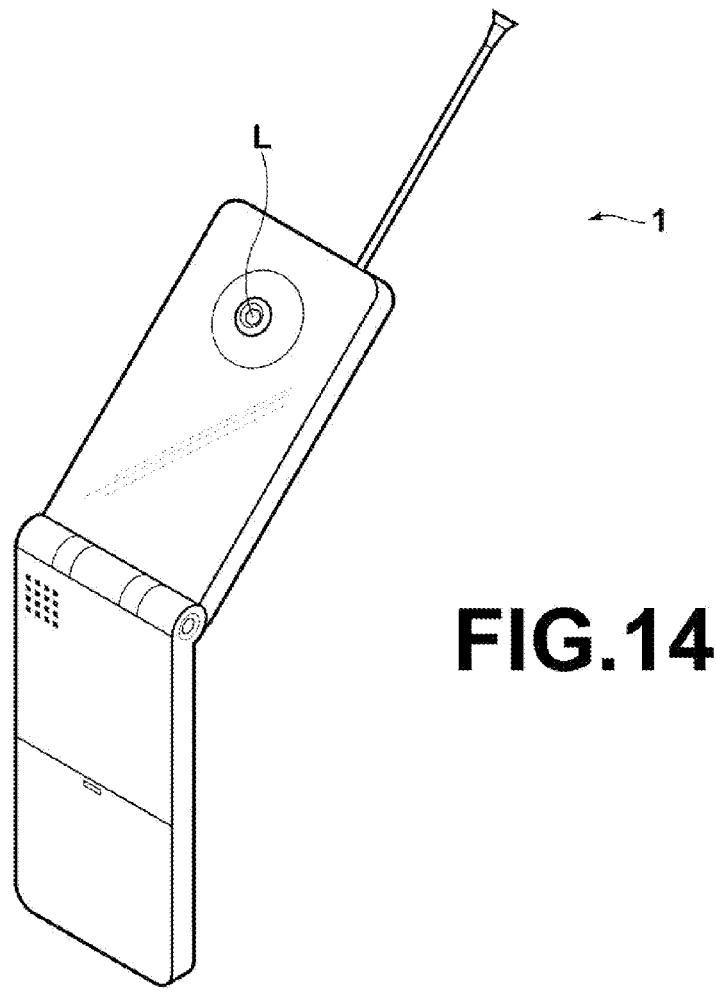
FIG. 14 shows an imaging device in the form of a mobile phone terminal provided with the imaging lens according to the invention.

FIG. 14 shows the appearance of a mobile phone terminal which is an imaging device 1 according to one embodiment of the invention. The imaging device 1 of the embodiment of the invention includes the imaging lens L of any of the embodiments of the invention, and an image sensor 100 (see FIG. 1), such as a CCD, for outputting an imaging signal according to an optical image formed by the imaging lens L. The image sensor 100 is placed in the image plane (image plane R14) of the imaging lens L.

Figure 15:
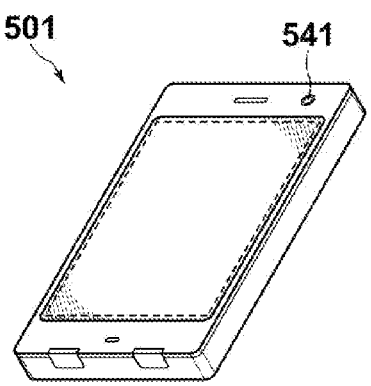
FIG. 15 shows an imaging device in the form of a smartphone provided with the imaging lens according to the invention.

FIG. 15 shows the appearance of a smartphone which is an imaging device 501 according to one embodiment of the invention. The imaging device 501 of the embodiment of the invention includes a camera unit 541 which includes the imaging lens L of any of the embodiments of the invention and an image sensor 100 (see FIG. 1), such as a CCD, for outputting an imaging signal according to an optical image formed by the imaging lens L. The image sensor 100 is placed in the image plane (image plane R14) of the imaging lens L.

Various optical members CG may be provided between the fifth lens L5 and the image sensor 100 depending on the configuration of the camera provided with the imaging lens L. For example, a cover glass for protecting the imaging area, and a flat plate-like optical member, such as an infrared cut-off filter, may be provided between the fifth lens L5 and the image sensor 100. In this case, for example, a flat plate-like cover glass with a coating having a filter effect, such as an effect of an infrared cut-off filter or ND filter, or a material having the same effect may be used as the optical member CG.

Alternatively, without using any optical member CG, the fifth lens L5 may be provided with a coating having the same effect as the optical member CG, for example. This allows reduction of the number of parts forming the lens and the entire length of the lens.

It is preferred that the imaging lens L include an aperture stop St disposed on the object side of the object-side surface of the second lens L2. Disposing the aperture stop St on the object side of the object-side surface of the second lens L2 in this manner allows minimizing increase of the incidence angle of rays traveling through the optical system on the image plane (the image sensor), in particular, at the marginal area of the imaging area. In order to enhance this effect, it is preferred that the aperture stop St be disposed on the object side of the object-side surface of the first lens L1. It should be noted that the description "disposed on the object side of the object-side surface of the second lens L2" means that the position of the aperture stop St along the optical axis direction is the same position as the intersection between a marginal axial ray and the object-side surface of the second lens L2 or a position nearer to the object side than the intersection. Similarly, "disposed on the object side of the object-side surface of the first lens L1" means that the position of the aperture stop St along the optical axis direction is the same position as the intersection between a marginal axial ray and the object-side surface of the first lens L1 or a position nearer to the object side than the intersection.

In the case where the aperture stop St is disposed on the object side of the object-side surface of the first lens L1 along the optical axis direction, it is preferred that the aperture stop St be disposed on the image side of the apex of the surface of the first lens L1. When the aperture stop St is disposed on the image side of the apex of the surface of the first lens L1 in this manner, reduction of the entire length of the imaging lens L including the aperture stop St can be achieved. It should be noted that the imaging lenses L according to the first, fifth and sixth embodiments (FIGS. 1, 5 and 6) are configuration examples where the aperture stop St is disposed on the object side of the object-side surface of the first lens L1, and the aperture stop St is disposed on the image side of the apex of the surface of the first lens L1. However, these embodiments are not intended to limit the invention, and the aperture stop St may be disposed on the object side of the apex of the surface of the first lens L1. Disposing the aperture stop St on the object side of the apex of the surface of the first lens L1 is somewhat disadvantageous in view of ensuring peripheral brightness than disposing the aperture stop St on the image side of the apex of the surface of the first lens L1. However, this preferably allows further minimizing increase of the incidence angle of rays traveling through the optical system on the image plane (the image sensor) at the marginal area of the imaging area. It should be noted that the aperture stop St shown in the drawings does not necessarily represent the size and shape thereof, but represents the position thereof along the optical axis Z1.

Figure 2:
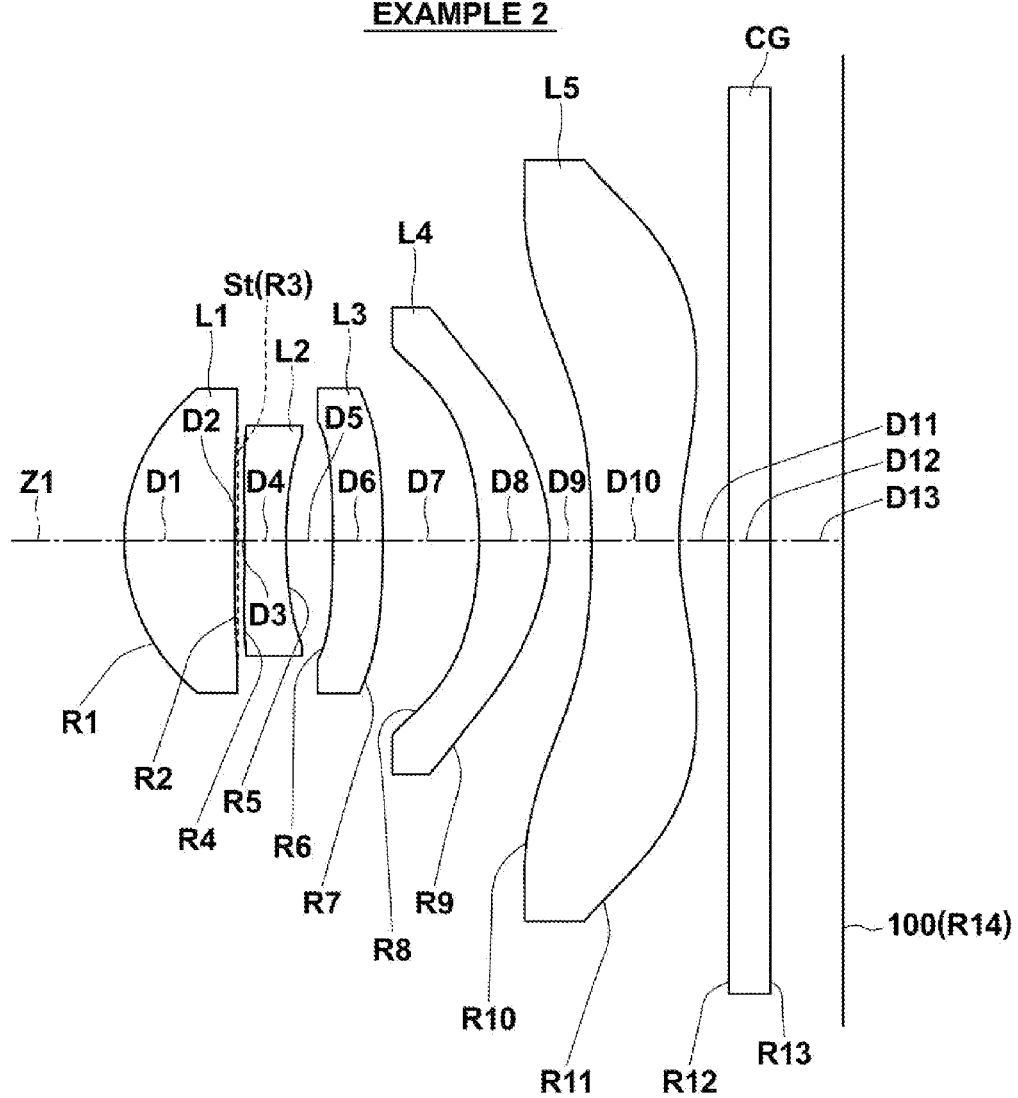
FIG. 2 is a lens sectional view illustrating a second configuration example of the imaging lens according to one embodiment of the invention and corresponding to Example 2.
Figure 3:
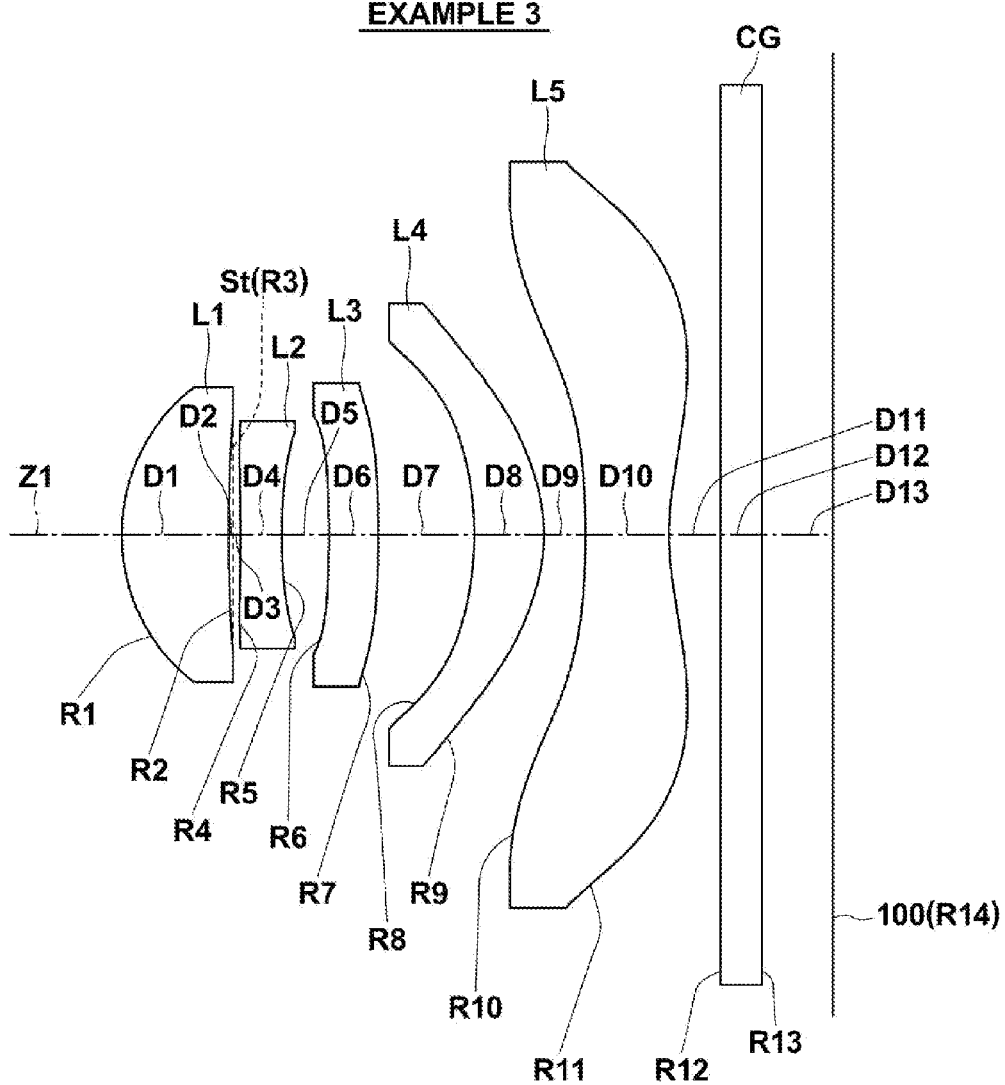
FIG. 3 is a lens sectional view illustrating a third configuration example of the imaging lens according to one embodiment of the invention and corresponding to Example 3.
Figure 4:
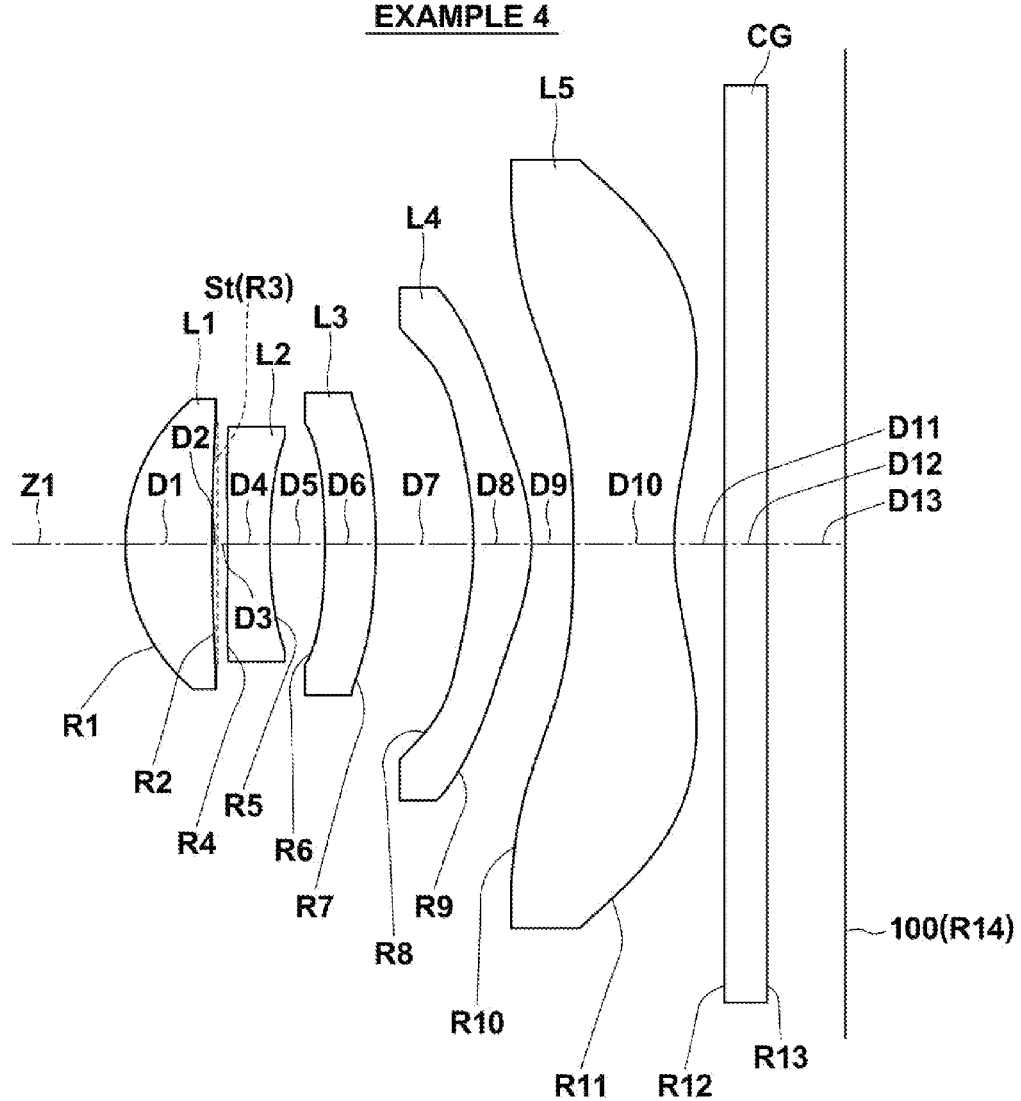
FIG. 4 is a lens sectional view illustrating a fourth configuration example of the imaging lens according to one embodiment of the invention and corresponding to Example 4.
Figure 5:
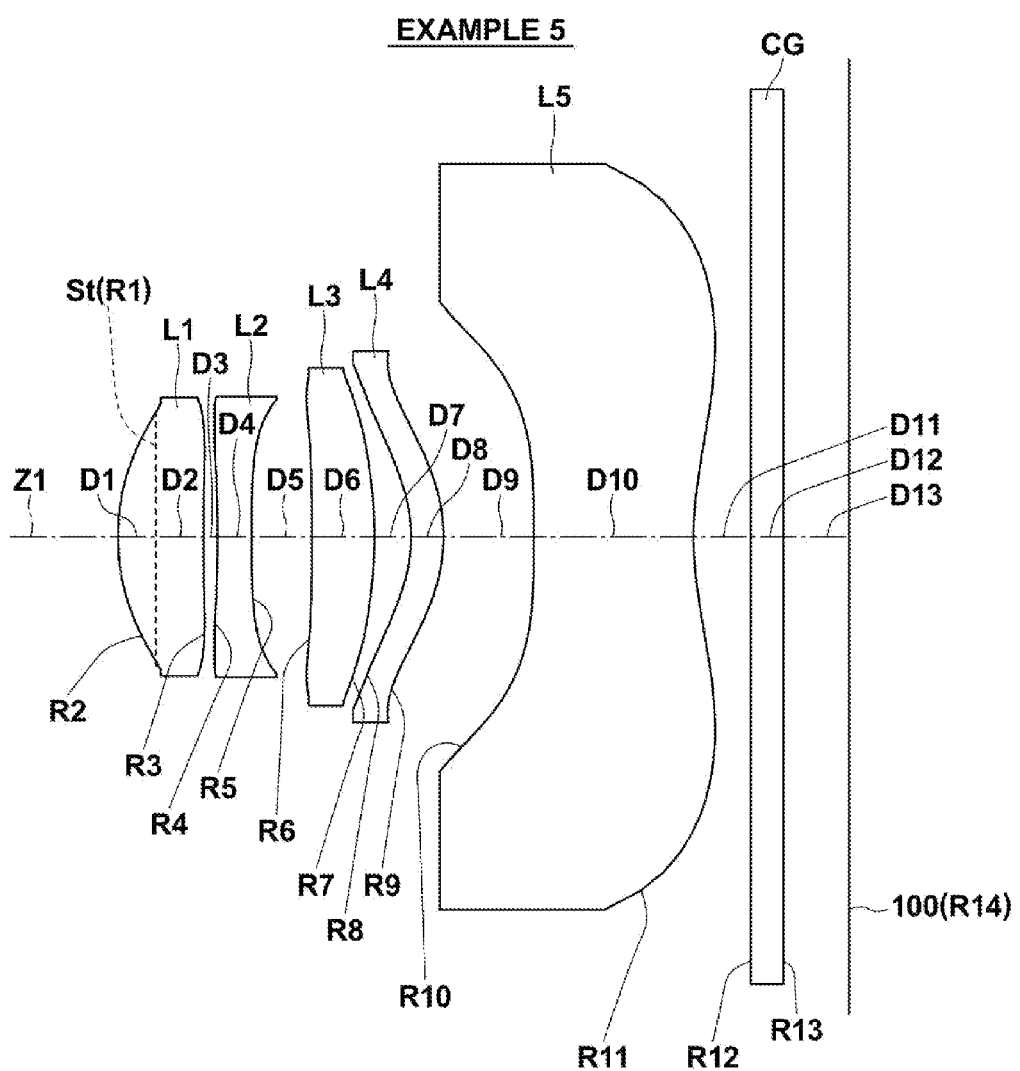
FIG. 5 is a lens sectional view illustrating a fifth configuration example of the imaging lens according to one embodiment of the invention and corresponding to Example 5.
Figure 6:
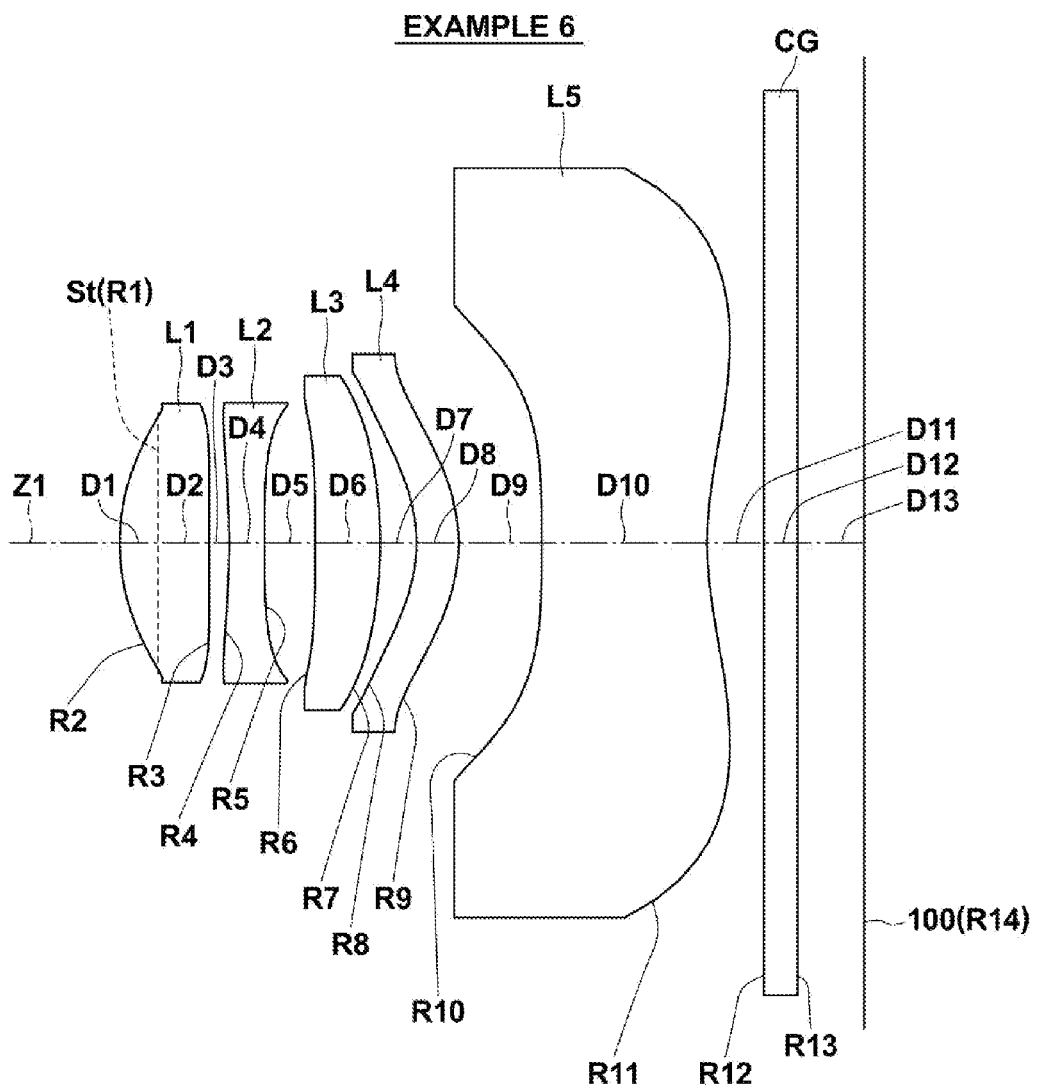
FIG. 6 is a lens sectional view illustrating a sixth configuration example of the imaging lens according to one embodiment of the invention and corresponding to Example 6.

Alternatively, the aperture stop St may be disposed between the first lens L1 and the second lens L2 along the optical axis direction, as with the imaging lens L according to the second to the fourth embodiments (FIGS. 2 to 4). In this case, successful correction of field curvature can be achieved. Disposing the aperture stop St between the first lens L1 and the second lens L2 along the optical axis direction is disadvantageous in view of ensuring telecentricity (that is, making the principal ray parallel to the optical axis as much as possible (making the incidence angle on the imaging area near to zero)) than disposing the aperture stop St on the object side of the object-side surface of the first lens L1 along the optical axis direction. However, preferable optical performance can be achieved by applying an image sensor, which has recently been accomplished along with the development of the image sensor technique, with reduced degradation of light reception efficiency and reduced color mixing due to increase of the incidence angle from those of conventional image sensors.

In this imaging lens L, the first lens L1 has a positive refractive power, and has a meniscus shape with the convex surface toward the object side in the vicinity of the optical axis. The first lens L1 having a meniscus shape with the convex surface toward the object side in the vicinity of the optical axis allows making the position of the posterior principal point of the first lens L1 nearer to the object side, and this preferably allows reduction of the entire length of the lens.

The second lens L2 has a biconcave shape in the vicinity of the optical axis. This allows successful correction of spherical aberration and chromatic aberration.

The third lens L3 has a positive refractive power in the vicinity of the optical axis, and has a meniscus shape with the convex surface toward the image side in the vicinity of the optical axis. The third lens L3 having a positive refractive power in the vicinity of the optical axis and having a meniscus shape with the convex surface toward the image side in the vicinity of the optical axis preferably allows minimizing astigmatism, and this facilitates achieving wider angle of view.

It is preferred that the fourth lens L4 have a positive refractive power in the vicinity of the optical axis. In this case, it is easier to reduce the focal length of the entire system, and this preferably allows reduction of the entire length of the lens.

Further, the fourth lens L4 has a convex surface toward the image side in the vicinity of the optical axis. The fourth lens L4 having a positive refractive power in the vicinity of the optical axis and having a convex surface toward the image side in the vicinity of the optical axis preferably allows correction of astigmatism, which tend to occur along with reduction of the entire length of the lens, and this facilitates reduction of the entire length of the lens and achieving wider angle of view. Further, the fourth lens L4 has a meniscus shape with the convex surface toward the image side in the vicinity of the optical axis. The fourth lens L4 having a meniscus shape with the convex surface toward the image side in the vicinity of the optical axis is advantageous for correction of astigmatism. Since both the third lens L3 and the fourth lens L4 have a meniscus shape with the convex surface toward the image side in the vicinity of the optical axis, astigmatism can more preferably be minimized, and this is advantageous for achieving wider angle of view.

The fifth lens L5 has a negative refractive power in the vicinity of the optical axis. Regarding the first to the fourth lenses L1 to L4 as one positive optical system, the fifth lens L5 having a negative refractive power makes the imaging lens L as a whole a telephoto configuration. This allows making the position of the posterior principal point of the entire lens nearer to the object side, thereby preferably allowing reduction of the entire length of the lens. Further, the fifth lens L5 has a concave surface toward the object side in the vicinity of the optical axis. This is advantageous for correction of astigmatism.

Further, as shown in the first to the sixth embodiments, it is preferred that the fifth lens L5 have a biconcave shape in the vicinity of the optical axis. In this case, a sufficiently strong negative refractive power of the fifth lens L5 can be achieved while minimizing increase of the absolute value of the curvature of each surface of the fifth lens L5. Further, the fifth lens L5 having a biconcave shape in the vicinity of the optical axis allows successful correction of distortion.

Still further, as shown in the first to the sixth embodiments, it is preferred that the fifth lens L5 have a concave surface toward the image side in the vicinity of the optical axis, and the image-side surface of the fifth lens L5 have an aspheric shape having at least one inflection point. In this case, increase of the incidence angle of rays traveling through the optical system on the image plane (the image sensor), in particular, at the marginal area of the imaging area can be minimized. It should be noted that the "inflection point" of the image-side surface of the fifth lens L5 refers to a point where the shape of the image-side surface of the fifth lens L5 changes from a convex shape to a concave shape (or from a concave shape to a convex shape) toward the image side. The position of the inflection point can be any position within an effective radius of the image-side surface of the fifth lens L5 along the radial direction from the optical axis.

According to the above-described imaging lens L, which has the five lens configuration as a whole, the configuration of each of the lens elements, the first to the fifth lenses L1 to L5, is optimized, thereby accomplishing a lens system having an image size that can accommodate the demand for higher resolution and having high imaging performance throughout from the central angle of view to the peripheral angle of view, while achieving reduction of the entire length of the lens.

In order to achieve even higher performance, it is preferred that each of the first to the fifth lenses L1 to L5 of the imaging lens L have an aspheric surface on at least one side thereof.

Further, it is preferred that each of the lenses L1 to L5 forming the imaging lens L be a single lens rather than a cemented lens. In this case, the number of aspheric surfaces is greater than that in a case where any of the lenses L1 to L5 are cemented together to forma cemented lens. This allows higher freedom of design of each lens, thereby preferably allowing reduction of the entire length of the lens.

Still further, in a case where the lens configuration of each of the first to the fifth lenses L1 to L5 forming the imaging lens L is set to provide, for example, a full angle of view of 70° or more, as with the imaging lenses L according to the first to the sixth embodiment, the imaging lens L is preferably applicable to an image sensor having a size that meets the demand for higher resolution and incorporated in a mobile phone, or the like.

Next, operation and effects related to conditional expressions of the imaging lens L having the above-described configuration are described in more detail. It is preferred that the imaging lens L satisfy any one or any combination of the conditional expressions described below. It is preferred that one or more conditional expressions to be satisfied are selected as appropriate depending on requirements on the imaging lens L.

First, it is more preferred that a focal length f1 of the first lens L1 and a focal length f of the entire system satisfy the conditional expression (1) below:

$$0.8 < f/f1 < 3 \qquad (1).$$

The conditional expression (1) defines a preferred numerical range of the ratio of the focal length f of the entire system to the focal length f1 of the first lens L1. When the refractive power of the first lens L1 is ensured such that the ratio does not become smaller than or equal to the lower limit of the conditional expression (1), the positive refractive power of the first lens L1 does not become excessively weak relative to the refractive power of the entire system, and reduction of the entire length of the lens can preferably be achieved. When the refractive power of the first lens L1 is maintained such that the ratio does not become greater than or equal to the upper limit of the conditional expression (1), the positive refractive power of the first lens L1 does not become excessively strong relative to the refractive power of the entire system, and successful correction of spherical aberration, in particular, can be achieved. In order to enhance this effect, it is more preferred that the conditional expression (1-1) below be satisfied:

$$1 < f/f1 < 2.5 \qquad (1\text{-}1).$$

Further, it is preferred that the focal length f of the entire system, a half angle of view ω, and a paraxial radius of curvature L5r of the image-side surface of the fifth lens L5 satisfy the conditional expression (2) below:

$$0.5 < f \cdot \tan \omega / L5r < 20 \qquad (2).$$

The conditional expression (2) defines a preferred numerical range of the ratio of a paraxial image height (f·tan ω) to the paraxial radius of curvature L5r of the image-side surface of the fifth lens L5. When the paraxial image height (f·tan ω) relative to the paraxial radius of curvature L5r of the image-side surface of the fifth lens L5 is set such that the ratio does not become smaller than or equal to the lower limit of the conditional expression (2), the absolute value of the paraxial radius of curvature L5r of the image-side surface of the fifth lens L5, which is the most image-side surface of the imaging lens L, does not become excessively large relative to the paraxial image height (f·tan ω), and this allows sufficient correction of field curvature while achieving reduction of the entire length of the lens. It should be noted that, in the case where the fifth lens L5 has an aspherical shape including a concave surface toward the image side and at least one inflection point, as shown by the imaging lens L of each embodiment, and the lower limit of the conditional expression (2) is satisfied, successful correction of field curvature can be achieved throughout from the central angle of view to the peripheral angle of view, and this is preferable to achieve wider angle of view. When the paraxial image height (f·tan ω) relative to the paraxial radius of curvature L5r of the image-side surface of the fifth lens L5 is set such that the ratio does not become greater than or equal to the upper limit of the conditional expression (2), the absolute value of the paraxial radius of curvature L5r of the image-side surface of the fifth lens L5, which is the most image-side surface of the imaging lens L, does not become excessively small relative to the paraxial image height (f·tan ω), and this allows minimizing increase of the incidence angle of rays traveling through the optical system on the image plane (the image sensor), in particular, at an intermediate angle of view, and also allows minimizing excessive correction of field curvature. In order to enhance this effect, it is preferred that the conditional expression (2-1) below be satisfied, or it is more preferred that the conditional expression (2-2) below be satisfied:

$$0.7 < f \cdot \tan \omega / L5r < 10 \quad (2\text{-}1), \text{ or}$$

$$1 < f \cdot \tan \omega / L5r < 5 \quad (2\text{-}2).$$

It is preferred that a combined focal length f345 of the third to the fifth lenses L3 to L5 and the focal length f of the entire system satisfy the conditional expression (3) below:

$$-10 < f/f345 < 0 \quad (3).$$

The conditional expression (3) defines a preferred numerical range of the ratio of the focal length f of the entire system to the combined focal length f345 of the third to the fifth lenses L3 to L5. When the combined focal length f345 of the third to the fifth lenses L3 to L5 is ensured such that the ratio does not become smaller than or equal to the lower limit of the conditional expression (3), the refractive power of the lens group consisting of the third to the fifth lenses L3 to L5 does not become excessively strong relative to the refractive power of the entire system, and this allows minimizing excessive correction of field curvature. When the combined focal length f345 of the third to the fifth lenses L3 to L5 is maintained such that the ratio does not become greater than or equal to the upper limit of the conditional expression (3), the refractive power of the lens group consisting of the third to the fifth lenses L3 to L5 does not become excessively weak relative to the refractive power of the entire system, and this preferably allows reduction of the entire length of the lens. In order to enhance this effect, it is more preferred that the conditional expression (3-1) below be satisfied, or it is even more preferred that the conditional expression (3-2) below be satisfied:

$$-5 < f/f345 < -0.1 \quad (3\text{-}1), \text{ or}$$

$$-1 < f/f345 < -0.15 \quad (3\text{-}2).$$

It is preferred that a paraxial radius of curvature L3f of the object-side surface of the third lens L3 and a paraxial radius of curvature L3r of the image-side surface of the third lens L3 satisfy the conditional expression (4) below:

$$0 < (L3f - L3r)/(L3f + L3r) < 1.2 \quad (4).$$

The conditional expression (4) defines a preferred numerical range of each of the paraxial radius of curvature L3f of the object-side surface of the third lens L3 and the paraxial radius of curvature L3r of the image-side surface of the third lens L3. When the paraxial radius of curvature L3f of the object-side surface of the third lens L3 and the paraxial radius of curvature L3r of the image-side surface of the third lens L3 are set such that the above ratio does not become smaller than or equal to the lower limit of the conditional expression (4), successful correction of astigmatism can be achieved. When the paraxial radius of curvature L3f of the object-side surface of the third lens L3 and the paraxial radius of curvature L3r of the image-side surface of the third lens L3 are set such that the above ratio does not become greater than or equal to the upper limit of the conditional expression (4), spherical aberration can preferably be minimized. In order to enhance this effect, it is more preferred that the conditional expression (4-1) below be satisfied, or it is even more preferred that the conditional expression (4-2) below be satisfied:

$$0 < (L3f - L3r)/(L3f + L3r) < 1.1 \quad (4\text{-}1), \text{ or}$$

$$0.05 < (L3f - L3r)/(L3f + L3r) < 1 \quad (4\text{-}2).$$

Further, it is preferred that a maximum image height H on the imaging area and a distance TTL from the object-side surface of the first lens L1 to the image plane along the optical axis, where the back focus portion of the distance is an equivalent air distance, satisfy the conditional expression (5) below:

$$1 < TTL/H < 1.55 \quad (5).$$

The conditional expression (5) defines a preferred numerical range of the ratio of the distance TTL (the entire length of the lens) from the object-side surface of the first lens L1 to the image plane relative to the maximum image height H. It should be noted that the back focus portion (the distance from the apex of the image-side surface of the fifth lens L5 to the image plane along the optical axis) of the entire length of the lens is an equivalent air distance. When the distance TTL from the object-side surface of the first lens L1 to the image plane relative to the maximum image height H is maintained such that the ratio does not become smaller than or equal to the lower limit of the conditional expression (5), excessive correction of field curvature can be minimized. On the other hand, ensuring the distance TTL from the object-side surface of the first lens L1 to the image plane relative to the maximum image height H such that the ratio does not become greater than or equal to the upper limit of the conditional expression (5) is advantageous for reduction of the entire length of the lens. In order to enhance this effect, it is more preferred that the conditional expression (5-1) below be satisfied, or it is even more preferred that the conditional expression (5-2) below be satisfied:

$$1.2 < TTL/H < 1.5 \quad (5\text{-}1) \text{ or}$$

$$1.3 < TTL/H < 1.45 \quad (5\text{-}2).$$

It is preferred that a combined focal length f34 of the third lens L3 and the fourth lens L4 and the focal length f of the entire system satisfy the conditional expression (6) below:

$$0.2 < f/f34 < 1.1 \quad (6).$$

The conditional expression (6) defines a preferred numerical range of the ratio of the focal length f of the entire system to the combined focal length f34 of the third lens L3 and the fourth lens L4. When the combined focal length f34 of the third lens L3 and the fourth lens L4 is ensured such that the ratio does not become smaller than or equal to the lower limit of the conditional expression (6), the combined refractive power of the third lens L3 and the fourth lens L4 does not become excessively weak relative to the refractive power of the entire system, and this allows successful correction of lateral chromatic aberration and distortion. When the combined focal length f34 of the third lens L3 and the fourth lens L4 is maintained such that the ratio does not become greater than or equal to the upper limit of the conditional expression (6), the combined refractive power of the third lens L3 and the fourth lens L4 does not become excessively strong relative to the refractive power of the entire system, and this allows successful correction of spherical aberration.

As described above, according to the imaging lens L of the embodiments of the invention, which has the five lens configuration as a whole, the configuration of each lens element is optimized, thereby accomplishing a lens system having a large image size that can accommodate the demand for higher resolution and having high imaging performance while achieving reduction of the entire length of the lens.

The imaging lens according to the embodiments of the invention can achieve even higher imaging performance by satisfying the above-described preferred conditions, as appropriate. The imaging device according to the embodiments of the invention outputs an imaging signal according to an optical image formed by the high-performance imaging lens of the embodiments of the invention, and therefore can capture a high-resolution image throughout from the central angle of view to the peripheral angle of view.

Next, specific numerical examples of the imaging lens according to the embodiments of the invention are described. In the following description, several numerical examples are explained at once.

Tables 1 and 2 presented below show specific lens data corresponding to the configuration of the imaging lens shown in FIG. 1. Specifically, Table 1 shows basic lens data, and Table 2 shows data about aspheric surfaces. The lens data shown in Table 1 is the lens data of the imaging lens according to Example 1, and each value in the column of surface number "Si" is the surface number of the i-th surface, where the most object-side surface of the lens elements is the 1st surface (the aperture stop St is the 1st surface) and the number is sequentially increased toward the image side. Each value in the column of radius of curvature "Ri", which corresponds to each symbol "Ri" shown in FIG. 1, is the value (mm) of radius of curvature of the i-th surface from the object side. Each value in the column of surface distance "Di" is the surface distance (mm) between the i-th surface Si and the i+1-th surface Si+1 from the object side along the optical axis Z. Each value in the column of "Ndj" is the value of refractive index with respect to the d-line (587.6 nm) of the j-th optical element from the object side. Each value in the column of "vdj" is the value of Abbe number with respect to the d-line of the j-th optical element from the object side. It should be noted that the lens data also shows values the focal length f (mm) and the back focus Bf (mm) of the entire system. It should be noted that the value of the back focus Bf is an equivalent air distance. It should be noted that values that vary depending on the wavelength, such as the focal length, are values with respect to the d-line, unless otherwise noted.

Each of the first to the fifth lenses L1 to L5 of the imaging lens according to Example 1 has aspheric surfaces on both sides. The value of radius of curvature of each aspheric surface in the basic lens data shown in Table 1 is a value of radius of curvature in the vicinity of the optical axis (paraxial radius of curvature).

Table 2 shows aspheric surface data of the imaging lens of Example 1. In each value shown as the aspheric surface data, the symbol "E" means that the numerical value following the symbol "E" is an exponent with the base being 10, and that the numerical value before the symbol "E" is multiplied by the numerical value represented by the exponential function with the base being 10. For example, "1.0E-02" means "1.0× $10^{-2}$".

As the aspheric surface data, values of coefficients Ai and KA in the formula of aspheric shape expressed as the formula (A) below are shown. More specifically, Z represents a length (mm) of a perpendicular line from a point on the aspheric surface at a height h from the optical axis to a plane (a plane perpendicular to the optical axis) tangential to the apex of the aspheric surface.

$$Z = \frac{C \times h^2}{1 + \sqrt{1 - KA \times C^2 \times h^2}} + \sum_i Ai \times h^i \quad (A)$$

where Z is a depth (mm) of the aspheric surface, h is a distance (mm) from the optical axis to the lens surface (height), C is a paraxial curvature=1/R (where R is a paraxial radius of curvature), Ai is an i-th order (where i is an integer of 3 or more) aspheric coefficient, and KA is an aspheric coefficient.

Similarly to the lens data of the imaging lens of Example 1, specific lens data corresponding to the configurations of imaging lenses shown in FIGS. 2 to 6 are shown as Examples 2 to 6 in Tables 3 to 12. In the imaging lenses according to Example 1 to 6, each of the first to the fifth lenses L1 to L5 has aspheric surfaces on both sides.

Figure 8:
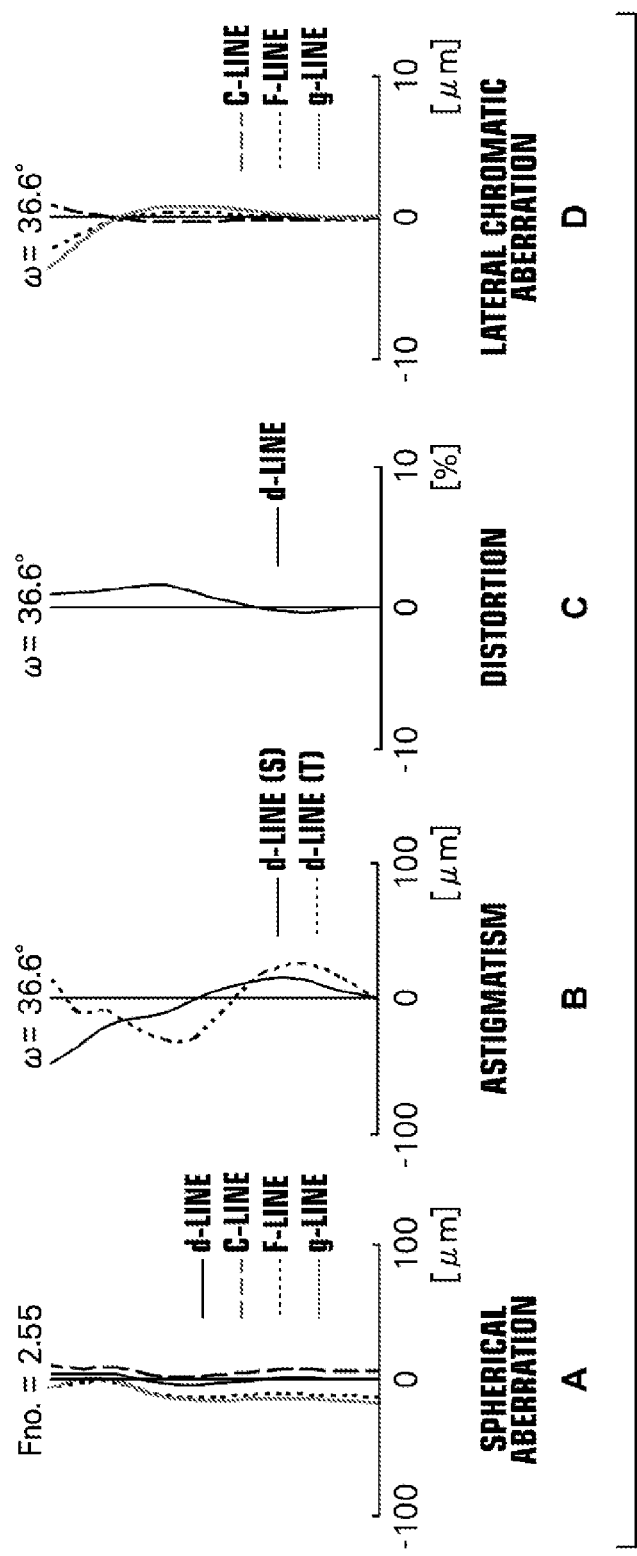
FIG. 8 is an aberration diagram showing various aberrations of the imaging lens according to Example 1 of the invention, where spherical aberration is shown at "A", astigmatism (field curvature) is shown at "B", distortion is shown at "C", and lateral chromatic aberration is shown at "D"
Figure 9:
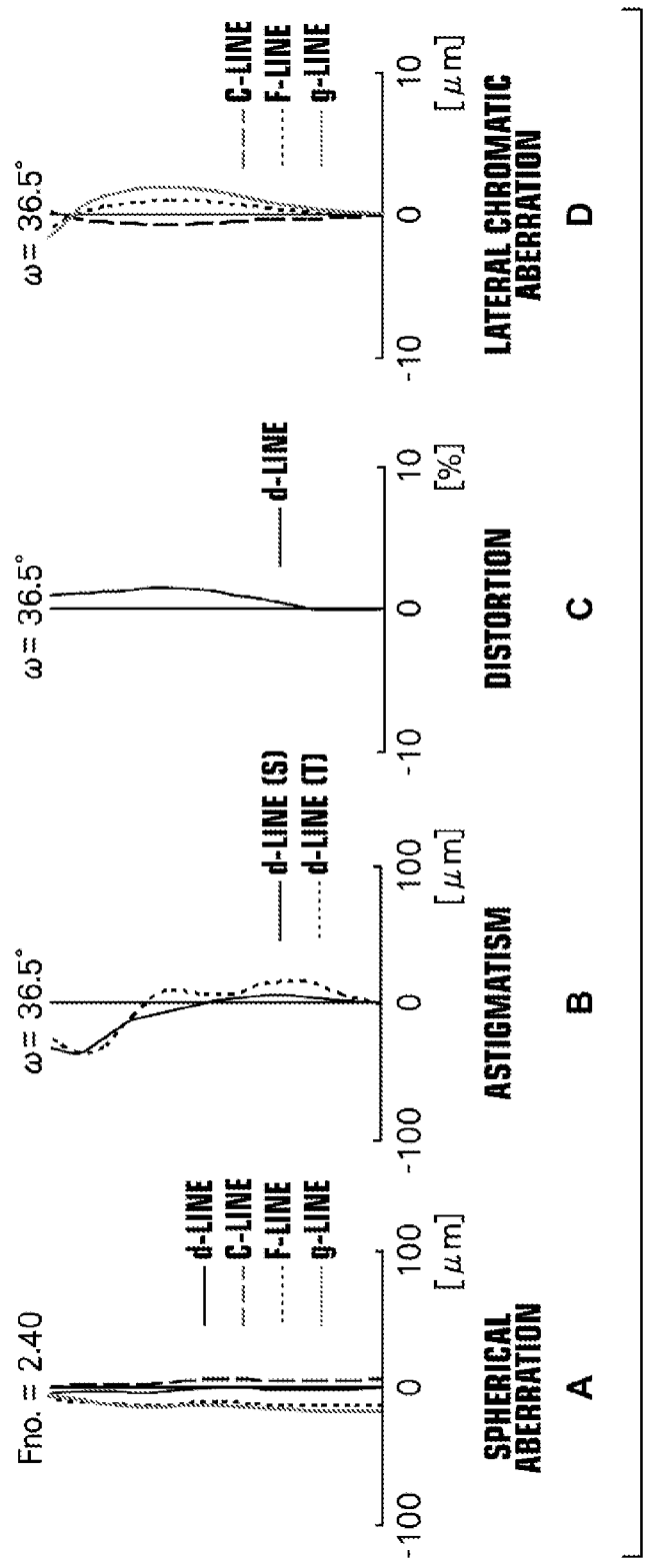
FIG. 9 is an aberration diagram showing various aberrations of the imaging lens according to Example 2 of the invention, where spherical aberration is shown at "A", astigmatism (field curvature) is shown at "B", distortion is shown at "C", and lateral chromatic aberration is shown at "D"
Figure 10:
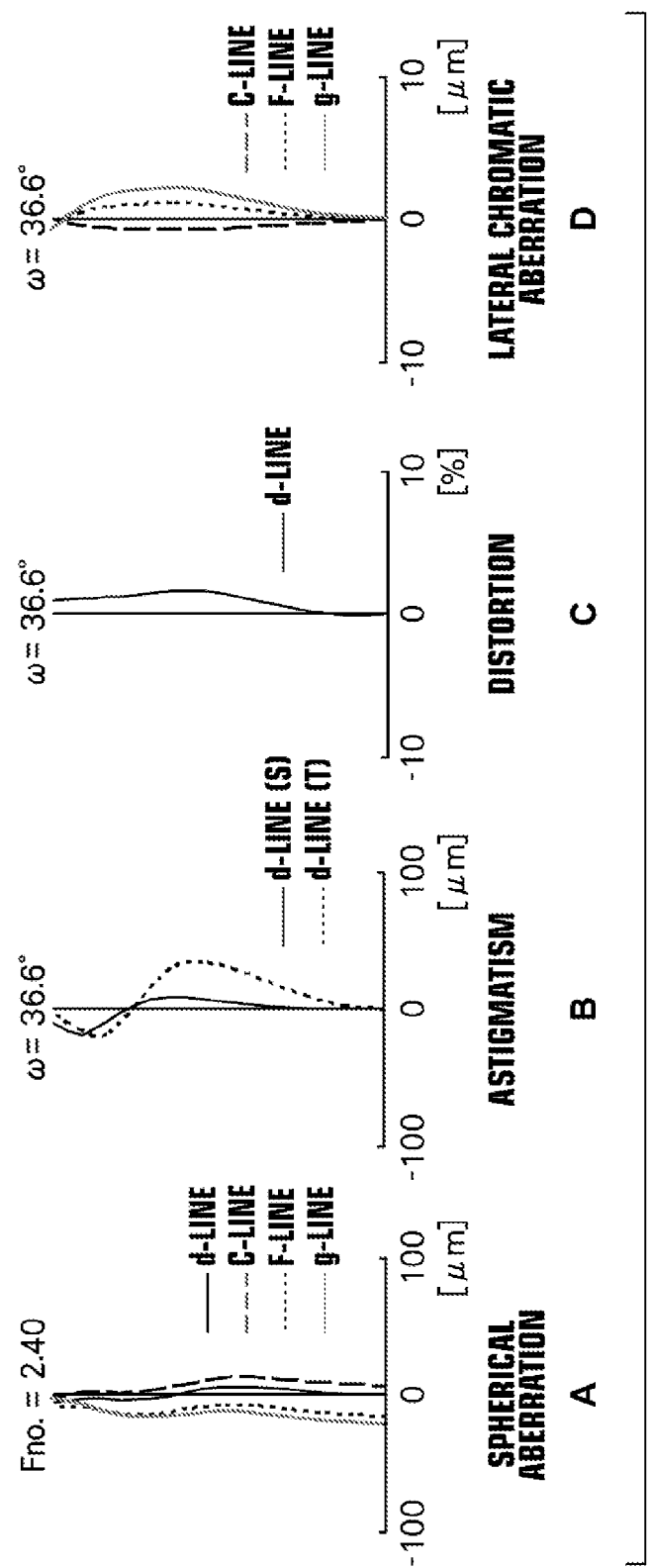
FIG. 10 is an aberration diagram showing various aberrations of the imaging lens according to Example 3 of the invention, where spherical aberration is shown at "A", astigmatism (field curvature) is shown at "B", distortion is shown at "C", and lateral chromatic aberration is shown at "D"
Figure 11:
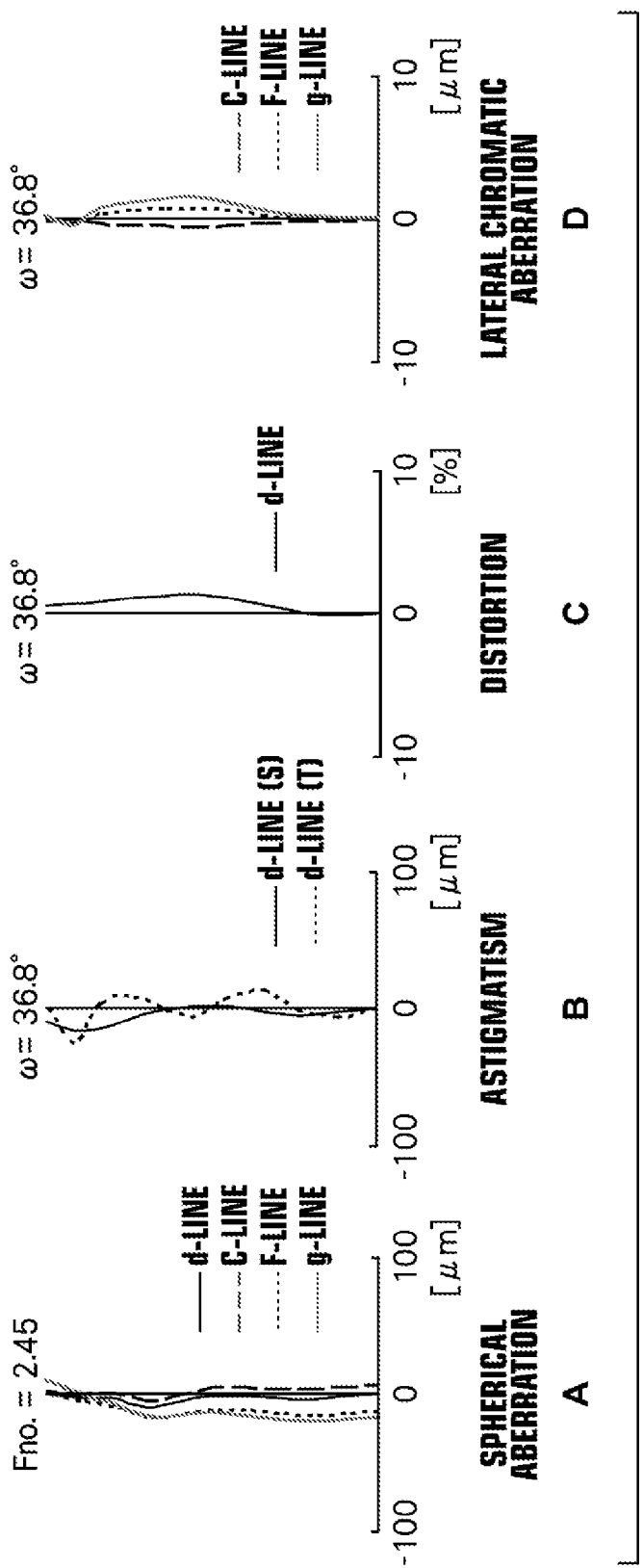
FIG. 11 is an aberration diagram showing various aberrations of the imaging lens according to Example 4 of the invention, where spherical aberration is shown at "A", astigmatism (field curvature) is shown at "B", distortion is shown at "C", and lateral chromatic aberration is shown at "D"
Figure 12:
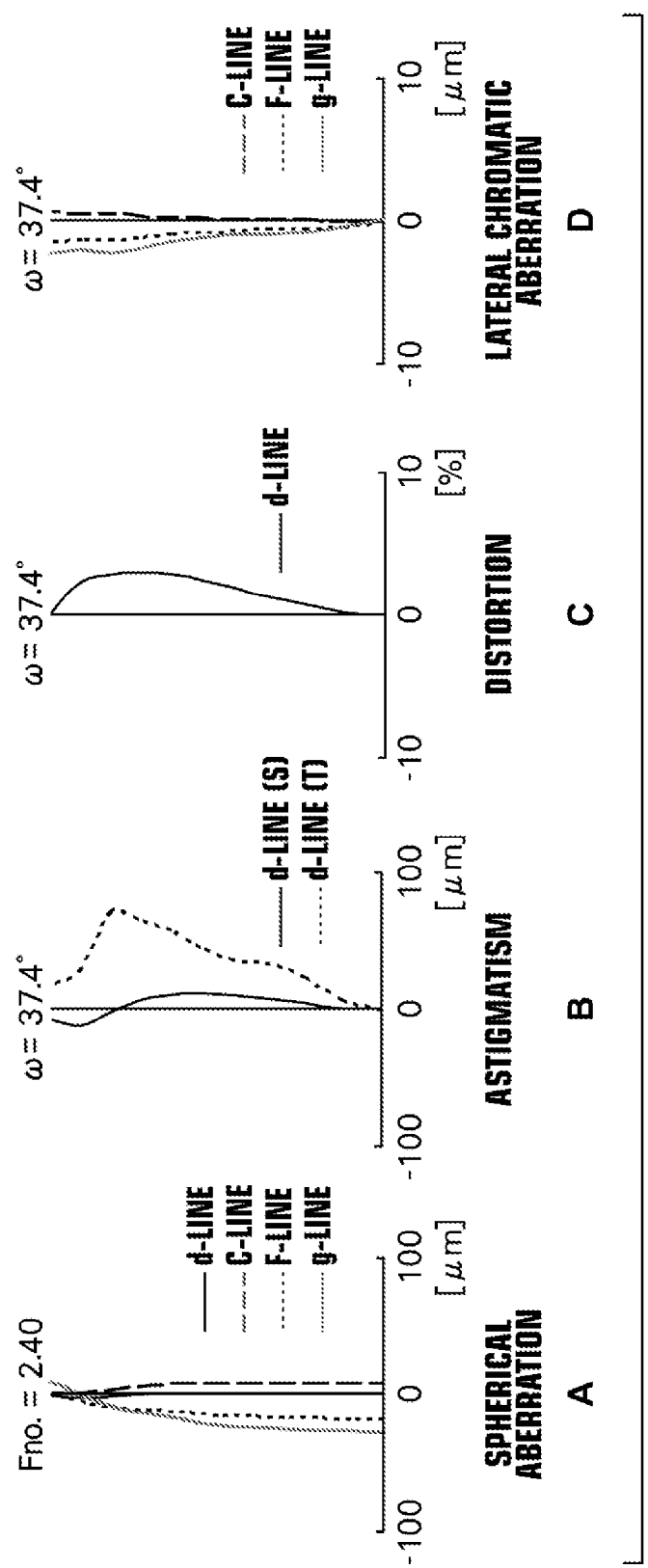
FIG. 12 is an aberration diagram showing various aberrations of the imaging lens according to Example 5 of the invention, where spherical aberration is shown at "A", astigmatism (field curvature) is shown at "B", distortion is shown at "C", and lateral chromatic aberration is shown at "D"
Figure 13:
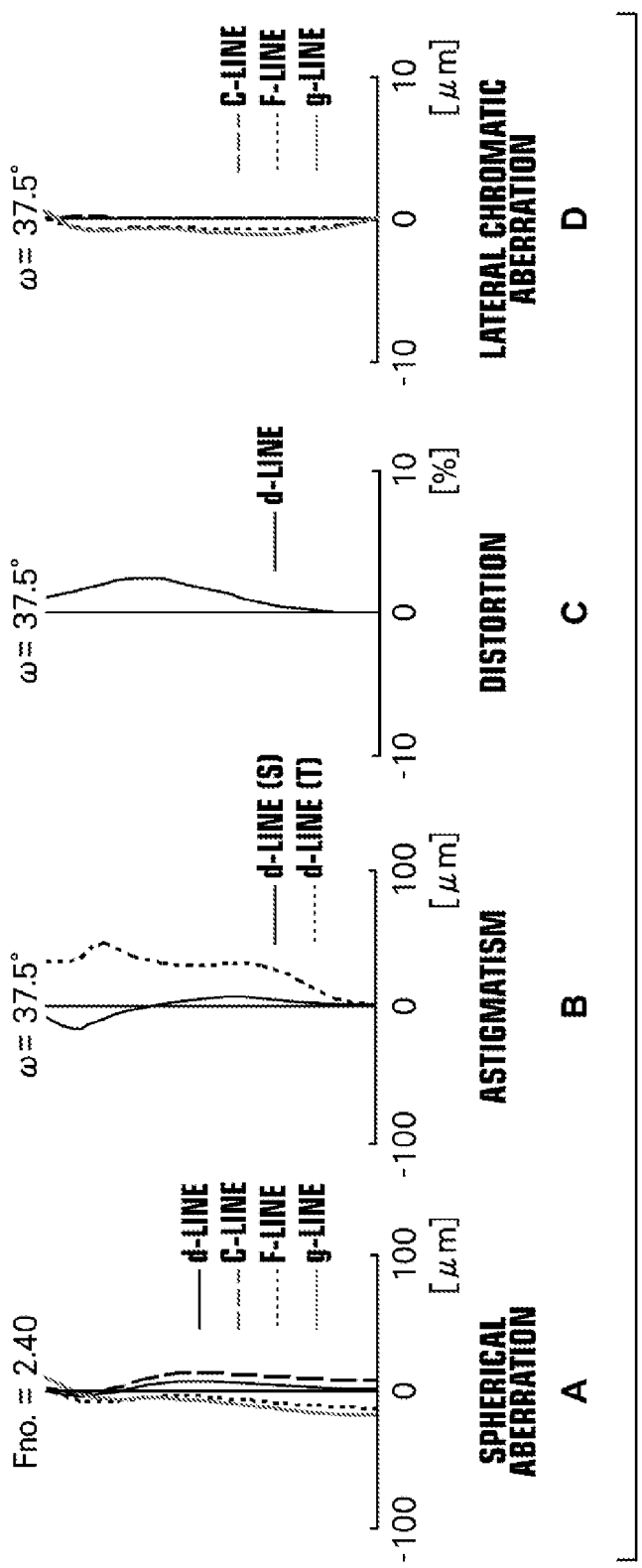
FIG. 13 is an aberration diagram showing various aberrations of the imaging lens according to Example 6 of the invention, where spherical aberration is shown at "A", astigmatism (field curvature) is shown at "B", distortion is shown at "C", and lateral chromatic aberration is shown at "D"

FIG. 8 shows, at "A" to "D", aberration diagrams of spherical aberration, astigmatism, distortion, and lateral chromatic aberration (chromatic aberration of magnification), respectively, of the imaging lens of Example 1. Each aberration shown in the aberration diagrams of spherical aberration, astigmatism (field curvature), and distortion is with respect to the d-line (the wavelength of 587.6 nm) used as the reference wavelength. The aberration diagrams of spherical aberration and lateral chromatic aberration also show the aberrations with respect to the F-line (the wavelength of 486.1 nm) and the C-line (the wavelength of 656.3 nm). The aberration diagram of spherical aberration also shows the aberration with respect to the g-line (the wavelength of 435.8 nm). In the aberration diagram of astigmatism, the aberration in the sagittal direction (S) is shown in the solid line and the aberration in the tangential direction (T) is shown in the dotted line. The symbol "Fno." means "F-number" and the symbol "ω" means "half angle of view".

Similarly, the various aberrations of the imaging lenses of Examples 2 to 6 are shown at "A" to "D" in FIGS. 9 to 13.

Further, Table 13 shows values relating to the conditional expressions (1) to (6) according to the invention for each of Examples 1 to 6.

As can be seen from the numerical data and the aberration diagrams, an imaging lens having large image size and high imaging performance is accomplished in each example while achieving reduction of the entire length of the lens.

It should be noted that the numerical values shown in the above-described tables are rounded at predetermined decimal places. The unit of the values of angle is degrees and the unit of the values of length is millimeters; however, this is only one example, and any other suitable units may be used since optical systems are usable when they are proportionally enlarged or reduced.

It should be noted that the imaging lens of the invention is not limited to the above-described embodiments and examples, and various medications may be made to the invention when the invention is carried out. For example, the values of the radius of curvature, the surface distance, the refractive index, the Abbe number, the aspheric coefficients, etc., of each lens component are not limited to the values shown in the numerical examples and may take different values.

Further, while the imaging lenses of the above-described examples are described on the assumption that they are used as fixed-focus lenses, the imaging lens of the invention can be configured to allow focusing. For example, automatic focusing can be achieved by moving the entire lens system or moving part of the lenses forming the lens system along the optical axis.

TABLE 1

| Example 1 f = 4.007, Bf = 0.942 | | | | |
|---|---|---|---|---|
| Si | Ri | Di | Ndj | vdj |
| 1 (aperture stop) | ∞ | −0.240 | | |
| *2 | 1.20078 | 0.600 | 1.544 | 55.9 |
| *3 | 14.70467 | 0.065 | | |
| *4 | −11.36480 | 0.293 | 1.632 | 23.4 |
| *5 | 3.48146 | 0.280 | | |
| *6 | −10.00069 | 0.300 | 1.632 | 23.4 |
| *7 | −6.71454 | 0.580 | | |
| *8 | −2.21997 | 0.423 | 1.544 | 55.9 |
| *9 | −1.20934 | 0.250 | | |
| *10 | −66.71067 | 0.497 | 1.544 | 55.9 |
| *11 | 1.44624 | 0.300 | | |
| 12 | ∞ | 0.250 | 1.517 | 64.2 |
| 13 | ∞ | 0.477 | | |
| 14 (image plane) | ∞ | | | |

*aspheric surface

TABLE 2

Example 1: Aspheric Surface Data

| Surface No. | KA | A4 | A6 | A8 | A10 |
|---|---|---|---|---|---|
| 2 | −3.0398205E+00 | 2.8123464E−01 | −4.4727010E−02 | −2.0373113E−01 | 7.5759860E−01 |
| 3 | −1.0238544E+01 | 3.0173843E−02 | −6.0410514E−02 | 4.8982837E−01 | −6.2076792E−01 |
| 4 | 9.9999999E+00 | 8.8527938E−02 | −2.1424950E−01 | 1.3345688E+00 | −4.0585947E+00 |
| 5 | 9.9999910E+00 | 3.9010611E−02 | 5.6482622E−01 | −2.3096596E+00 | 6.1177885E+00 |
| 6 | 9.9999998E+00 | −1.0870110E−01 | −5.7704049E−02 | 2.1333147E−01 | −9.2389730E−01 |
| 7 | 1.0000009E+01 | −3.0962616E−02 | −2.2876687E−01 | 5.7587030E−01 | −7.6825828E−01 |
| 8 | 3.0117596E+00 | 3.9554427E−02 | −9.3431400E−02 | −3.1016047E−01 | 5.9219638E−01 |
| 9 | −7.2546848E+00 | −2.0224009E−01 | 2.5122519E−01 | −4.9835510E−01 | 4.5557641E−01 |
| 10 | −1.9999997E+01 | −1.0040430E−01 | −3.7213676E−03 | 2.7156971E−02 | −9.9388075E−03 |
| 11 | −1.2363927E+01 | −7.4387761E−02 | 2.7857575E−02 | −8.8533400E−03 | 1.2848647E−03 |

| | A12 | A14 | A16 |
|---|---|---|---|
| 2 | −9.7994474E−01 | 5.8829212E−01 | 0.0000000E+00 |
| 3 | −6.6940177E−01 | 1.9123917E+00 | 0.0000000E+00 |
| 4 | 5.7809720E+00 | −2.7985604E+00 | 0.0000000E+00 |
| 5 | −8.8570822E+00 | 5.9275059E+00 | 0.0000000E+00 |
| 6 | 1.6733475E+00 | −1.4260978E+00 | 0.0000000E+00 |
| 7 | 5.0293816E−01 | −1.2175845E−01 | 0.0000000E+00 |
| 8 | −3.8753059E−01 | 9.8871445E−02 | 0.0000000E+00 |
| 9 | −1.7661549E−01 | 2.4680257E−02 | 0.0000000E+00 |
| 10 | 1.4893791E−03 | −8.4045492E−05 | 0.0000000E+00 |
| 11 | −5.5218459E−05 | −1.5012385E−06 | 0.0000000E+00 |

TABLE 3

Example 2
f = 4.017, Bf = 0.901

| Si | Ri | Di | Ndj | vdj |
|---|---|---|---|---|
| *1 | 1.22514 | 0.662 | 1.544 | 55.9 |
| *2 | 31.25884 | 0.020 | | |
| 3 (aperture stop) | ∞ | 0.042 | | |
| *4 | −15.62502 | 0.250 | 1.632 | 23.4 |
| *5 | 3.12699 | 0.280 | | |
| *6 | −9.99926 | 0.300 | 1.632 | 23.4 |
| *7 | −6.99542 | 0.580 | | |
| *8 | −2.06145 | 0.423 | 1.544 | 55.9 |
| *9 | −1.15420 | 0.250 | | |
| *10 | −6.93092 | 0.526 | 1.544 | 55.9 |
| *11 | 1.80495 | 0.300 | | |
| 12 | ∞ | 0.250 | 1.517 | 64.2 |
| 13 | ∞ | 0.437 | | |
| 14 (image plane) | ∞ | | | |

*aspheric surface

TABLE 4

Example 2: Aspheric Surface Data

| Surface No. | KA | A4 | A6 | A8 | A10 |
|---|---|---|---|---|---|
| 1 | −3.2425414E+00 | 2.8123464E−01 | −1.8402663E−01 | 2.6310035E−01 | −3.0980938E−01 |
| 2 | −1.9999991E+01 | 3.0173843E−02 | −5.6907025E−02 | 3.3416586E−01 | −7.2243427E−01 |
| 4 | −1.9999999E+01 | 8.8527938E−02 | 8.8532019E−02 | −3.0132871E−01 | 5.7766007E−01 |
| 5 | 1.0000009E+01 | 3.9010611E−02 | 5.6149643E−02 | −2.7219392E+00 | 7.7385197E+00 |
| 6 | −1.9986300E+01 | −1.0870110E−01 | −2.4386153E−01 | 5.8549849E−01 | −2.0537737E+00 |
| 7 | 9.9999996E+00 | −3.0962616E−02 | −2.4417848E−01 | 4.8493693E−01 | −6.4146476E−01 |
| 8 | 2.5993950E+00 | 3.9554427E−02 | 8.5040992E−02 | −6.1776262E−01 | 8.7835709E−01 |
| 9 | −4.9777649E+00 | −2.0224009E−01 | 3.3013704E−01 | −5.1474686E−01 | 4.1524864E−01 |
| 10 | −2.0000009E+01 | −1.0040430E−01 | 3.1256464E−02 | 4.4682077E−03 | −3.6222591E−03 |
| 11 | −1.5617535E+01 | −7.4387761E−02 | 2.2728331E−02 | −6.2060220E−03 | 7.8740951E−04 |

| | A12 | A14 | A16 |
|---|---|---|---|
| 1 | 2.9838432E−01 | −1.4641405E−01 | 0.0000000E+00 |
| 2 | 4.8766661E−01 | −3.1787555E−02 | 0.0000000E+00 |
| 4 | −7.8639365E−01 | 5.8313067E−01 | 0.0000000E+00 |
| 5 | −1.1525123E+01 | 7.5326775E+00 | 0.0000000E+00 |
| 6 | 3.8132723E+00 | −3.1323672E+00 | 0.0000000E+00 |
| 7 | 4.3420354E−01 | −8.1759230E−02 | 0.0000000E+00 |
| 8 | −5.4496566E−01 | 1.3571558E−01 | 0.0000000E+00 |
| 9 | −1.5402933E−01 | 2.1279338E−02 | 0.0000000E+00 |
| 10 | 6.3839177E−04 | −3.8115222E−05 | 0.0000000E+00 |
| 11 | −3.0066998E−05 | −1.7660801E−07 | 0.0000000E+00 |

TABLE 5

Example 3
f = 4.007, Bf = 0.909

| Si | Ri | Di | Ndj | νdj |
|---|---|---|---|---|
| *1 | 1.21334 | 0.648 | 1.544 | 55.9 |
| *2 | 15.38696 | 0.027 | | |
| 3 (aperture stop) | ∞ | 0.044 | | |
| *4 | −11.76608 | 0.250 | 1.632 | 23.4 |
| *5 | 3.71918 | 0.285 | | |
| *6 | −9.99989 | 0.300 | 1.632 | 23.4 |
| *7 | −7.42341 | 0.580 | | |
| *8 | −2.11059 | 0.421 | 1.544 | 55.9 |
| *9 | −1.13906 | 0.250 | | |
| *10 | −6.36895 | 0.507 | 1.544 | 55.9 |
| *11 | 1.78138 | 0.312 | | |
| 12 | ∞ | 0.250 | 1.517 | 64.2 |
| 13 | ∞ | 0.432 | | |
| 14 (image plane) | ∞ | | | |

*aspheric surface

TABLE 6

Example 3: Aspheric Surface Data

| Surface No. | KA | A4 | A6 | A8 | A10 |
|---|---|---|---|---|---|
| 1 | −3.2332814E+00 | 2.8123464E−01 | −1.3546848E−01 | 1.6455427E−01 | −1.3236840E−01 |
| 2 | −2.0000000E+01 | 3.0173843E−02 | 2.3058518E−02 | −8.4566594E−02 | 2.1420549E−01 |
| 4 | −1.9999990E+01 | 8.8527938E−02 | 1.2603194E−02 | −1.3386560E−01 | 2.0306461E−01 |
| 5 | 1.0000000E+01 | 3.9010611E−02 | 5.3702546E−01 | −2.4959473E+00 | 6.9957047E+00 |
| 6 | 1.0000000E+01 | −1.0870110E−01 | −1.8415387E−01 | 8.1957410E−02 | −1.6181153E−01 |
| 7 | 1.0000000E+01 | −3.0962616E−02 | −2.0625171E−01 | 3.6653230E−01 | −4.7068916E−01 |
| 8 | 2.7225753E+00 | 3.9554427E−02 | 5.7339612E−02 | −5.4072320E−01 | 8.4953845E−01 |
| 9 | −4.5056280E+00 | −2.0224009E−01 | 3.2796965E−01 | −5.0482271E−01 | 4.1469974E−01 |
| 10 | −2.0000000E+01 | −1.0040430E−01 | 2.0221498E−02 | 1.2364193E−02 | −6.0221336E−03 |
| 11 | −1.3924314E+01 | −7.4387761E−02 | 2.1281630E−02 | −6.7549282E−03 | 1.3453118E−03 |

| | A12 | A14 | A16 |
|---|---|---|---|
| 1 | 1.1375716E−01 | −3.4578044E−02 | 0.0000000E+00 |
| 2 | −3.8991555E−01 | 2.6462935E−01 | 0.0000000E+00 |
| 4 | −1.8824947E−01 | 1.4414626E−01 | 0.0000000E+00 |
| 5 | −1.0379952E+01 | 6.8480418E+00 | 0.0000000E+00 |
| 6 | 5.2433038E−01 | −8.0178170E−01 | 0.0000000E+00 |
| 7 | 3.7153257E−01 | −8.4760207E−02 | 0.0000000E+00 |
| 8 | −5.7271158E−01 | 1.4967673E−01 | 0.0000000E+00 |
| 9 | −1.5902757E−01 | 2.2847865E−02 | 0.0000000E+00 |
| 10 | 9.8302117E−04 | −5.7068337E−05 | 0.0000000E+00 |
| 11 | −1.7100034E−04 | 1.1201736E−05 | 0.0000000E+00 |

TABLE 7

Example 4
f = 3.981, Bf = 0.928

| Si | Ri | Di | Ndj | νdj |
|---|---|---|---|---|
| *1 | 1.20480 | 0.515 | 1.544 | 55.9 |
| *2 | 20.00397 | 0.029 | | |
| 3 (aperture stop) | ∞ | 0.061 | | |
| *4 | −17.86002 | 0.250 | 1.632 | 23.4 |
| *5 | 3.32476 | 0.325 | | |
| *6 | −4.99496 | 0.300 | 1.632 | 23.4 |
| *7 | −4.24492 | 0.580 | | |
| *8 | −2.17568 | 0.340 | 1.544 | 55.9 |

TABLE 7-continued

Example 4
f = 3.981, Bf = 0.928

| Si | Ri | Di | Ndj | νdj |
|---|---|---|---|---|
| *9 | −1.21147 | 0.250 | | |
| *10 | −10.09346 | 0.594 | 1.544 | 55.9 |
| *11 | 1.63382 | 0.300 | | |
| 12 | ∞ | 0.250 | 1.517 | 64.2 |
| 13 | ∞ | 0.463 | | |
| 14 (image plane) | ∞ | | | |

*aspheric surface

TABLE 8

Example 4: Aspheric Surface Data

| Surface No. | KA | A4 | A6 | A8 | A10 |
|---|---|---|---|---|---|
| 1 | −2.9879454E+00 | 2.8123464E−01 | −1.7250678E−01 | 4.3343214E−01 | −8.8304434E−01 |
| 2 | −2.0000000E+01 | 3.0173843E−02 | −6.3408481E−02 | 1.9368589E−01 | −2.8772252E−01 |
| 4 | 9.9169807E+00 | 8.8527938E−02 | −1.1055826E−01 | 5.6406006E−01 | −1.8857657E+00 |
| 5 | 1.0000009E+01 | 3.9010611E−02 | 4.3246178E−01 | −1.9985378E+00 | 5.5961516E+00 |
| 6 | 1.0000000E+01 | −1.0870110E−01 | −2.3259002E−01 | 3.9556537E−01 | −8.1733574E−01 |
| 7 | 8.5305416E+00 | −3.0962616E−02 | −1.5311983E−01 | 3.0607190E−01 | −4.9459461E−01 |
| 8 | 2.4188533E+00 | 3.9554427E−02 | 4.2027757E−01 | −7.8090848E−01 | 6.0490957E−01 |
| 9 | −5.0472742E+00 | −2.0224009E−01 | 6.4140505E−01 | −7.3710927E−01 | 4.0458392E−01 |
| 10 | −2.0000007E+01 | −1.0040430E−01 | 2.5076903E−02 | 1.0169804E−02 | −5.5947636E−03 |
| 11 | −1.0232233E+01 | −7.4387761E−02 | 1.6854525E−02 | −3.7411057E−03 | 4.9755084E−04 |

| | A12 | A14 | A16 |
|---|---|---|---|
| 1 | 1.0963824E+00 | −5.5194381E−01 | 0.0000000E+00 |
| 2 | 6.5743947E−02 | 8.4596523E−02 | 0.0000000E+00 |
| 4 | 3.0171977E+00 | −1.7312885E+00 | 0.0000000E+00 |
| 5 | −8.4253587E+00 | 5.9183141E+00 | 0.0000000E+00 |
| 6 | 7.1401496E−01 | −2.4860946E−01 | 0.0000000E+00 |
| 7 | 4.6217980E−01 | −8.9160029E−02 | 0.0000000E+00 |
| 8 | −2.4616608E−01 | 4.4979662E−02 | 0.0000000E+00 |
| 9 | −1.0834290E−01 | 1.1314658E−02 | 0.0000000E+00 |
| 10 | 9.3761572E−04 | −5.5277131E−05 | 0.0000000E+00 |
| 11 | −4.3585879E−05 | 2.7995917E−06 | 0.0000000E+00 |

TABLE 9

Example 5
f = 3.912, Bf = 0.883

| Si | Ri | Di | Ndj | vdj |
|---|---|---|---|---|
| 1 (aperture stop) | ∞ | −0.230 | | |
| *2 | 1.40768 | 0.522 | 1.535 | 56.3 |
| *3 | 15.07152 | 0.087 | | |
| *4 | −5.34200 | 0.206 | 1.634 | 23.8 |
| *5 | 27.67127 | 0.366 | | |
| *6 | −39.76745 | 0.382 | 1.530 | 55.8 |
| *7 | −2.95738 | 0.223 | | |
| *8 | −0.97863 | 0.198 | 1.614 | 25.6 |
| *9 | −1.05381 | 0.547 | | |
| *10 | −39.93006 | 0.973 | 1.530 | 55.8 |
| *11 | 2.15327 | 0.349 | | |
| 12 | ∞ | 0.200 | 1.517 | 64.2 |
| 13 | ∞ | 0.402 | | |
| 14 (image plane) | ∞ | | | |

*aspheric surface

TABLE 10

Example 5: Aspheric Surface Data

| Surface No. | KA | A4 | A6 | A8 | A10 |
|---|---|---|---|---|---|
| 2 | 1.2090458E+00 | −1.8093115E−03 | −1.5276355E−02 | −5.3581141E−02 | 2.9743617E−02 |
| 3 | 1.0000000E+00 | −1.8694638E−02 | −7.1313105E−02 | 6.9892753E−04 | −1.2616625E−01 |
| 4 | −5.6482034E+00 | 1.2130866E−01 | −8.0366786E−02 | 7.5568247E−02 | −5.5056141E−02 |
| 5 | 8.5293931E+01 | 1.9368012E−01 | −4.2265608E−02 | 1.5651505E−01 | 1.1759901E−02 |
| 6 | 1.0000000E+00 | −5.3908649E−02 | −5.4619219E−02 | 5.6407796E−02 | 4.3192537E−02 |
| 7 | 1.6141480E+00 | 3.7279874E−02 | −2.6347920E−02 | −3.4135290E−02 | 1.3869914E−02 |
| 8 | −8.1923315E−01 | 1.2513876E−01 | −1.9666419E−02 | 7.6553848E−02 | −1.0262331E−01 |
| 9 | 3.1856669E−01 | 1.4411273E−01 | −8.5274684E−03 | 5.3503088E−02 | 8.4380790E−03 |
| 10 | 6.2004073E+02 | −2.1398202E−01 | 7.1065388E−02 | −2.2845960E−02 | 1.8991543E−03 |
| 11 | −7.7284915E+00 | −7.2405841E−02 | 2.1664946E−02 | −4.5921856E−03 | 2.1140092E−04 |

| | A12 | A14 | A16 |
|---|---|---|---|
| 2 | 2.7917265E−02 | −1.5778524E−01 | 0.0000000E+00 |
| 3 | 4.0422806E−02 | 3.7327853E−02 | 0.0000000E+00 |
| 4 | −5.0416695E−02 | 1.2789176E−01 | 0.0000000E+00 |
| 5 | 1.1524840E−01 | −1.7324732E−01 | 0.0000000E+00 |
| 6 | −1.7673078E−02 | 7.9957518E−02 | −6.0751676E−02 |
| 7 | −1.9312685E−02 | 3.0018023E−02 | 0.0000000E+00 |
| 8 | 3.0357205E−02 | 1.6099871E−02 | −1.1055942E−02 |
| 9 | −9.0759685E−03 | −4.5817979E−03 | 1.4438454E−03 |
| 10 | 1.4529685E−03 | 2.8961256E−04 | −1.0250804E−04 |
| 11 | 7.6780048E−05 | −1.0194932E−05 | 0.0000000E+00 |

TABLE 11

Example 6
f = 3.874, Bf = 0.876

| Si | Ri | Di | Ndj | νdj |
|---|---|---|---|---|
| 1 (aperture stop) | ∞ | −0.230 | | |
| *2 | 1.40302 | 0.536 | 1.535 | 56.3 |
| *3 | 94.02640 | 0.120 | | |
| *4 | −4.38966 | 0.209 | 1.634 | 23.8 |
| *5 | 18.61810 | 0.304 | | |
| *6 | −82.91422 | 0.391 | 1.530 | 55.8 |
| *7 | −3.00722 | 0.219 | | |
| *8 | −0.97817 | 0.252 | 1.614 | 25.6 |
| *9 | −1.04567 | 0.497 | | |
| *10 | −35.04061 | 0.991 | 1.530 | 55.8 |
| *11 | 2.11564 | 0.342 | | |
| 12 | ∞ | 0.200 | 1.517 | 64.2 |
| 13 | ∞ | 0.400 | | |
| 14 (image plane) | ∞ | | | |

*aspheric surface

TABLE 12

Example 6: Aspheric Surface Data

| Surface No. | KA | A4 | A6 | A8 | A10 |
|---|---|---|---|---|---|
| 2 | 1.1929274E+00 | −3.6582269E−03 | −2.0720866E−02 | −4.7021522E−02 | 3.8758795E−02 |
| 3 | 1.0009998E+03 | −1.4710005E−02 | −6.6508007E−02 | −2.6685417E−03 | −1.2598288E−01 |
| 4 | −1.0759490E+01 | 1.1707542E−01 | −9.7558111E−02 | 6.0580496E−02 | −4.8924941E−02 |
| 5 | −9.9195923E+01 | 1.9059329E−01 | −9.5154517E−02 | 1.7736887E−01 | 5.2135545E−04 |
| 6 | −9.7593801E+01 | −8.3648560E−02 | −7.6281678E−02 | 4.4851082E−02 | 1.9608706E−02 |
| 7 | 3.2674032E+00 | 8.2241053E−03 | −4.8470453E−02 | −4.8085668E−03 | 3.2770793E−02 |
| 8 | −7.7191586E−01 | 9.7700986E−02 | −2.7839540E−02 | 9.0156473E−02 | −9.2510834E−02 |
| 9 | 3.4405944E−01 | 1.4837661E−01 | −1.1526581E−02 | 3.8430380E−02 | 6.8806759E−03 |
| 10 | 5.5400013E+02 | −1.7983138E−01 | 6.5666068E−02 | −2.5863766E−02 | 1.9159902E−03 |
| 11 | −1.0493367E+01 | −5.6349214E−02 | 1.5582396E−02 | −3.6036205E−03 | 2.2335691E−04 |

| Surface No. | A12 | A14 | A16 |
|---|---|---|---|
| 2 | 1.6736319E−02 | −1.8052039E−01 | 0.0000000E+00 |
| 3 | −9.7191051E−03 | 7.3743368E−02 | 0.0000000E+00 |
| 4 | −3.8113774E−02 | 1.5449045E−01 | 0.0000000E+00 |
| 5 | 9.3061540E−02 | −5.2231174E−02 | 0.0000000E+00 |
| 6 | −3.6127539E−02 | 1.1210041E−01 | −1.8047923E−02 |
| 7 | −2.9901686E−02 | 8.4285463E−03 | 0.0000000E+00 |
| 8 | 2.8672641E−02 | 1.0293244E−02 | −1.7776975E−02 |
| 9 | −7.3258955E−03 | −3.0482402E−03 | 1.7246014E−03 |
| 10 | 1.4577133E−03 | 2.5651252E−04 | −4.6117420E−05 |
| 11 | 3.4991377E−05 | −5.1336916E−06 | 0.0000000E+00 |

TABLE 13

Values Relating to Conditional Expressions

| No. | Conditional Expression | Example 1 | Example 2 | Example 3 | Example 4 | Example 5 | Example 6 |
|---|---|---|---|---|---|---|---|
| 1 | f/f1 | 1.693 | 1.727 | 1.682 | 1.706 | 1.366 | 1.458 |
| 2 | f · tanω/R5r | 2.058 | 1.647 | 1.671 | 1.823 | 1.274 | 1.313 |
| 3 | f/f345 | −0.347 | −0.374 | −0.387 | −0.444 | −0.241 | −0.200 |
| 4 | (R3f − R3r)/(R3f + R3r) | 0.197 | 0.177 | 0.148 | 0.081 | 0.862 | 0.930 |
| 5 | TTL/H | 1.409 | 1.410 | 1.405 | 1.389 | 1.408 | 1.408 |
| 6 | f/f34 | 1.047 | 1.064 | 1.094 | 0.991 | 0.567 | 0.619 |

It should be noted that the above-described values of the paraxial radius of curvature, the surface distance, the refractive index, and the Abbe number were obtained by measurement performed by an expert in optical measurement according to the following methods.

The paraxial radius of curvature is obtained by measuring each lens using an ultra-high precision three-dimensional measuring device, UA3P (available from Panasonic Factory Solutions Co., Ltd.), and using the following procedure. Tentative values of a paraxial radius of curvature $R_m$ (where m is a natural number) and a conic constant $K_m$ are set and inputted to the UA3P, and an n-th order aspheric coefficient An in the formula of aspheric shape is calculated from the tentative values and the measurement data using a fitting function attached to the UA3P. It is assumed that $C=1/R_m$ and $KA=K_m-1$ in the above-described formula (A) of aspheric shape. Based on $R_m$, $K_m$, An, and the formula of aspheric shape, the depth Z of the aspheric surface in the optical axis direction depending on the height h from the optical axis is calculated. Then, for each height h from the optical axis, a difference between the calculated depth Z and the measured depth value Z' is calculated, and whether or not the difference is within a predetermined range is determined. If it is determined that the difference is within the predetermined range, the set value of $R_m$ is used as the paraxial radius of curvature. On the other hand, if the difference is out of the predetermined range, $R_{m+1}$ and $K_{m+1}$ are set by changing at least one of the values of $R_m$ and $K_m$ used to calculate the difference, and are inputted to the UA3P to perform the above-described calculations, and then, for each height h from the optical axis, whether or not a difference between the calculated depth Z and the measured depth value Z' is within the predetermined range is determined. This operation is repeated until the difference between the calculated depth Z and the measured depth value Z' for each height h from the optical axis falls within the predetermined range. It should be noted that the predetermined range here is within 200 nm. The range of the height h is within the range from 0 to ⅕ of the maximum outer diameter of the lens.

The surface distance is obtained by measurement using a central thickness and surface spacing measurement device, OptiSurf (available from Trioptics), for length measurement of an assembled lens.

The refractive index is obtained by measurement using a precision refractometer, KPR-2000 (available from Shimadzu Corporation), with a subject temperature of 25° C. A refractive index measured with respect to the d-line (the wavelength of 587.6 nm) is a refractive index Nd. Similarly, a refractive index measured with respect to the e-line (the wavelength of 546.1 nm) is a refractive index Ne, a refractive index measured with respect to the F-line (the wavelength of 486.1 nm) is a refractive index NF, a refractive index measured with respect to the C-line (the wavelength of 656.3 nm) is a refractive index NC, and a refractive index measured with respect to the g-line (the wavelength of 435.8 nm) is a refractive index Ng. The Abbe number vd with respect to the d-line is obtained by calculating $vd=(Nd-1)/(NF-NC)$ by substituting the values of Nd, NF and NC obtained by the above-described measurement into the equation.

What is claimed is:

1. An imaging lens substantially consisting of five lenses consisting of, in order from an object side:
    a first lens having a positive refractive power and having a meniscus shape with a convex surface toward the object side;
    a second lens having a biconcave shape;
    a third lens having a positive refractive power and having a meniscus shape with a convex surface toward the image side;
    a fourth lens having a meniscus shape with a convex surface toward the image side; and
    a fifth lens having a negative refractive power and having a concave surface toward the object side.

2. The imaging lens as claimed in claim 1, wherein the conditional expression below is further satisfied:

$$0.8 < f/f1 < 3 \qquad (1),$$

where f is a focal length of the entire system, and f1 is a focal length of the first lens.

3. The imaging lens as claimed in claim 2, wherein the conditional expression below is satisfied:

$$1 < f/f1 < 2.5 \qquad (1\text{-}1),$$

where f is a focal length of the entire system, and f1 is a focal length of the first lens.

4. The imaging lens as claimed in claim 1, wherein the fifth lens has a biconcave shape.

5. The imaging lens as claimed in claim 1, wherein the fifth lens has an image-side surface having at least one inflection point.

6. The imaging lens as claimed in claim 1, wherein the fourth lens has a positive refractive power.

7. The imaging lens as claimed in claim 1, wherein the conditional expression below is satisfied:

$$0.5 < f \tan \omega / L5r < 20 \qquad (2),$$

where f is a focal length of the entire system, ω is a half angle of view, and L5r is a paraxial radius of curvature of an image-side surface of the fifth lens.

8. The imaging lens as claimed in claim 7, wherein the conditional expression below is satisfied:

$$0.7 < f \tan \omega / L5r < 10 \qquad (2\text{-}1),$$

where f is a focal length of the entire system, ω is a half angle of view, and L5r is a paraxial radius of curvature of the image-side surface of the fifth lens.

9. The imaging lens as claimed in claim 8, wherein the conditional expression below is satisfied:

$$1 < f \tan \omega / L5r < 5 \qquad (2\text{-}2),$$

where f is a focal length of the entire system, ω is a half angle of view, and L5r is a paraxial radius of curvature of the image-side surface of the fifth lens.

10. The imaging lens as claimed in claim 1, wherein the conditional expression below is satisfied:

$$-10 < f/f345 < 0 \qquad (3),$$

where f is a focal length of the entire system, and f345 is a combined focal length of the third to the fifth lenses.

11. The imaging lens as claimed in claim 10, wherein the conditional expression below is satisfied:

$$-5 < f/f345 < -0.1 \qquad (3\text{-}1),$$

where f is a focal length of the entire system and f345 is a combined focal length of the third to the fifth lenses.

12. The imaging lens as claimed in claim 11, wherein the conditional expression below is satisfied:

$$-1 < f/f345 < -0.15 \qquad (3\text{-}2),$$

where f is a focal length of the entire system, and f345 is a combined focal length of the third to the fifth lenses.

13. The imaging lens as claimed in claim 1, wherein the conditional expression below is satisfied:

$$0 < (L3f - L3r)/(L3f + L3r) < 1.2 \quad (4),$$

where L3f is a paraxial radius of curvature of an object-side surface of the third lens, and L3r is a paraxial radius of curvature of an image-side surface of the third lens.

14. The imaging lens as claimed in claim 13, wherein the conditional expression below is satisfied:

$$0 < (L3f - L3r)/(L3f + L3r) < 1.1 \quad (4\text{-}1),$$

where L3f is a paraxial radius of curvature of the object-side surface of the third lens, and L3r is a paraxial radius of curvature of the image-side surface of the third lens.

15. The imaging lens as claimed in claim 14, wherein the conditional expression below is satisfied:

$$0.05 < (L3f - L3r)/(L3f + L3r) < 1 \quad (4\text{-}2),$$

where L3f is a paraxial radius of curvature of the object-side surface of the third lens, and L3r is a paraxial radius of curvature of the image-side surface of the third lens.

16. The imaging lens as claimed in claim 1, wherein the conditional expression below is satisfied:

$$1 < TTL/H < 1.55 \quad (5),$$

where TTL is a distance from an object-side surface of the first lens to an image plane, where a back focus portion of the distance is an equivalent air distance, and H is a maximum image height.

17. The imaging lens as claimed in claim 16, wherein the conditional expression below is satisfied:

$$1.2 < TTL/H < 1.5 \quad (5\text{-}1),$$

where TTL is a distance from the object-side surface of the first lens to the image plane, where the back focus portion of the distance is an equivalent air distance, and H is a maximum image height.

18. The imaging lens as claimed in claim 17, wherein the conditional expression below is satisfied:

$$1.3 < TTL/H < 1.45 \quad (5\text{-}2),$$

where TTL is a distance from the object-side surface of the first lens to the image plane, where the back focus portion of the distance is an equivalent air distance, and H is a maximum image height.

19. The imaging lens as claimed in claim 1, wherein the conditional expression below is satisfied:

$$0.2 < f/f34 < 1.1 \quad (6),$$

where f is a focal length of the entire system, and f34 is a combined focal length of the third lens and the fourth lens.

20. An imaging device comprising the imaging lens as claimed in claim 1.

* * * * *